United States Patent [19]

Takaku et al.

[11] Patent Number: 5,777,870
[45] Date of Patent: Jul. 7, 1998

[54] DRIVE CONTROL COMMANDING UNIT, A SYNCHRONOUS CONTOL SYSTEM FOR A PLURALITY OF DRIVE CONTROL COMMANDING UNITS, AND A SYNCHRONOUS CONTROL METHOD FOR THE UNITS

[75] Inventors: Hideaki Takaku; Nobuyasu Takaki, both of Aichi, Japan

[73] Assignee: Mitsubishi Denki Kabushiki Kaisha, Tokyo, Japan

[21] Appl. No.: 527,069

[22] Filed: Sep. 13, 1995

[30] Foreign Application Priority Data

Oct. 25, 1994 [JP] Japan .................... 6-260155

[51] Int. Cl.$^6$ .................................................. H04B 3/54
[52] U.S. Cl. ................ 364/132; 395/551; 395/556; 370/294
[58] Field of Search ................. 364/132, 270, 364/270.3, 271, 232.8, 238.3, DIG. 1, DIG. 2; 370/464, 498, 503, 294, 360; 395/551, 552, 558, 559, 556; 318/568.23, 628, 687, 799, 608; 304/431.05

[56] References Cited

U.S. PATENT DOCUMENTS

| | | | |
|---|---|---|---|
| 4,177,451 | 12/1979 | Yamaguchi | 340/147 R |
| 4,641,044 | 2/1987 | Shiraishi | 307/269 |
| 4,873,703 | 10/1989 | Crandall et al. | 375/118 |
| 4,991,101 | 2/1991 | Ishikawa | 364/431.05 |
| 5,287,010 | 2/1994 | Hagiwara | 307/269 |
| 5,305,453 | 4/1994 | Boudry et al. | 395/550 |
| 5,398,238 | 3/1995 | Inagawa et al. | 370/29 |
| 5,442,273 | 8/1995 | Ikawa et al. | 318/799 |
| 5,477,117 | 12/1995 | Saito | 318/568.22 |

FOREIGN PATENT DOCUMENTS

| | | | |
|---|---|---|---|
| 3-154450 | 7/1991 | Japan | H04L 7/00 |
| 5-73147 | 3/1993 | Japan | G05D 3/00 |

*Primary Examiner*—James P. Trammell
*Assistant Examiner*—Bryan Bui
*Attorney, Agent, or Firm*—Sughrue, Mion, Zinn, Macpeak & Seas, PLLC

[57] ABSTRACT

A drive control commanding unit is provided which, when plural such units constitute a system, can configure the system as a synchronous system which can conduct a synchronous operation free from synchronism deviation. The drive control commanding unit has an operation clock generator 9 which generates an operation clock signal, an interruption generator 11 which outputs an interruption signal at every cycle of the operation clock signal. There also is a station number setting unit 13 through which a station number indicative whether the drive control commanding unit is operated as a master or as a slave is set; a synchronous timing signal transmitter 15 which operates only when the unit is used as the master, and which outputs a synchronous timing signal on the basis of the operation clock signal; a synchronous controller 18 which operates only when the unit is used as a slave, and which outputs a synchronous operation starting signal on the basis of an error state signal indicative of a ready state of a synchronous operation, and a synchronous timing signal received from the master drive control commanding unit. A synchronous checker 22 judges whether the operation of a slave drive control commanding unit is synchronized with that of the master drive control commanding unit or not, and an error signal generator 24 outputs an error signal based on the error state signal.

16 Claims, 14 Drawing Sheets

5,777,870

1

DRIVE CONTROL COMMANDING UNIT, A SYNCHRONOUS CONTOL SYSTEM FOR A PLURALITY OF DRIVE CONTROL COMMANDING UNITS, AND A SYNCHRONOUS CONTROL METHOD FOR THE UNITS

BACKGROUND OF THE INVENTION

1. Field of the Invention

The present invention relates to a method used in the field of general industrial machines or the like wherein a plurality of drive control commanding units are synchronously controlled in synchronism with the movement of a machine. For example, the invention relates to an assembly line in which several robots perform different works at the same time in synchronism with the movement of a conveyor. The invention also relates to a synchronous control system for a plurality of drive control commanding units, and to a drive control commanding unit used in the synchronous control system.

2. Description of Background Art

FIG. 12 is a block diagram of a synchronous system for conventional drive control commanding units. In the figure, 144 designates the drive control commanding unit, 8 designates a microcomputer which controls the operation of the respective drive control commanding units, 9 designates an operation clock generator which generates an operation clock signal 5, 11 designates an interruption generator which outputs an interruption signal 12 so as to interrupt the microcomputer 8 based on the operation clock signal 5, 4 designates a drive control unit the motion of which is controlled by the drive control commanding unit, 145 designates a position detector which outputs a pulse signal 146 corresponding to a rotary angle, and 147 designates a pulse counter which counts the pulse signal 146.

In each of the conventional drive control commanding units structured as described above, when the power source for the drive control commanding unit 144 is turned on, the operation clock generator 9 starts operating to generate the operation clock signal 5. The interruption generator 11 outputs the interruption signal 12 to the microcomputer 8 in synchronism with the fall of the operation clock signal 5. On the basis of the interruption level, the microcomputer 8 judges whether interruption by the interruption signal 12 can be permitted or not. If the interruption can be permitted, the microcomputer executes the interruption processing by the interruption signal 12. This interruption processing varies with the respective drive control commanding units.

A case where the plurality of drive control commanding units 144 are operated in synchronism with the single position detector 145 will be described. First, the position detector 145 gives the pulse signal 146 corresponding to its rotary angle, simultaneously to the plurality of drive control commanding units 144. In each of the drive control commanding units 144, the pulse counter 147 counts the pulse signal 146. Next, the microcomputer 8 reads out the data from the pulse counter 147, and gives a command to the drive control unit 4 to control it according to the data. Therefore, the plurality of the drive control commanding units 144 can be operated in synchronism with the rotation of the single position detector 145.

FIG. 13 shows a conventional example of synchronism between units which is conducted in a positioning unit disclosed in Japanese Unexamined Patent Publication (Kokai) No. 5-73,147. The reference numeral 148a designates a master positioning unit, 148b designates a slave

2 positioning unit, 149 designates a CPU which controls the inside processing of a positioning controller, and 150 designates a communication interface through which data exchange between the master and the slave is conducted. The master and the slave are connected to each other with a data communication line 151 and a synchronous clock line 152.

In the conventional example of FIG. 13 structured as described above, positional information is sent and received via the data communication line 151 between the master positioning unit 148a and the slave positioning unit 148b, and the positional information is shared by the data communication line 151 between the master positioning unit 148a and the slave positioning unit 148b, whereby the synchronism of the master and the slave is attained. A clock signal is supplied from the master positioning unit 148a to the slave positioning unit 148b via the synchronous clock line 152, in order to conduct time division on the processing of sending and receiving positional information and the processing for a drive unit, and to match the timing of starting the processing of the master positioning unit 148a to that of the slave positioning unit 148b.

FIG. 14 shows a conventional example of a synchronous system disclosed in Japanese Unexamined Patent Publication (Kokai) No. 3-154,450. The reference numeral 153 designates a reception circuit which receives a reception signal 154 from an external unit, 155 designates a timing extract circuit which extracts a reception timing 156 of the instant at which the reception signal 154 is received, 157 designates a timing cut detecting circuit which detects the fact that the reception signal 154 is unchanged in level and the timing of the reception timing 156 cannot be extracted, 156 designates an external clock signal which is supplied from an external unit, 159 designates an external clock cut detecting circuit which detects the fact that an external clock signal 158 becomes unchanged in level, 160 designates a mode control circuit which switches over the mode in which the timing of outputting a reference clock signal 163 is made to coincide with one of the reception timing 156, the external clock signal 158, or the internal clock signal, 161 designates a mode selector switch, and 162 designates a clock generator which generates a reference clock signal 163.

In the conventional example of FIG. 14 structured as described above, the reception signal 154 received in the reception circuit 153 is output to the timing extract circuit 155, and the reception timing 156 is extracted in synchronism with the reception timing in the timing extract circuit 155. On the basis of the detection results indicative whether or not the timing cut detecting circuit 157 and the external clock cut detecting circuit 159 have succeeded in detecting the timings, the mode control circuit 160 selects one of the three modes, i.e., the timing signal output from the timing extract circuit 155, the external clock signal 158 supplied from the outside, or the internal operation. The output selected by the mode control circuit 160 is input into the clock generator 162 which in turn generates the reference clock signal 163.

In the case where a synchronous system is structured using a plurality of conventional drive control commanding units such as those shown in FIGS. 12 and 13, the operation clock signals of the drive control commanding units operate in an entirely asynchronous manner. Even when the power source switches are simultaneously turned on, for example, the difference in characteristics of the power sources of the drive control commanding units may cause the timing of applying the power source voltage in one drive control commanding unit to be deviated from that in another drive control commanding unit as shown in FIG. 15A. This makes the operation clock signals of the master and slave drive control commanding units deviated from each other. Even when the timing of applying the power source voltage in the master coincides with that in the slave as shown in FIG. 15B, there may arise a difference in synchronism of the operation clock signals of the drive control commanding units because of the difference in characteristics of components such as crystal oscillators and counters constituting the clock generators. In such a case, the deviations of the operation clock signals are accumulated. Consequently, the drive control commanding units independently operate on the basis of the respective operation clock signals which are generated at different timing inherent to the units. Even when synchronization is provided in accordance with only a synchronous clock signal which is externally supplied, therefore, a timing error which corresponds at the maximum to one cycle of the operation clock signal is produced by the cycles of the operation clock signal, in the operations of the drive control commanding units. In the case where the drive control units are operated fast, the positional difference between the drive control units due to the synchronism deviation becomes so conspicuous that cooperation between plural machines cannot be attained.

In the case where a synchronous system is structured by using a plurality of conventional drive control commanding units and a single set of position detecting means, each of the drive control commanding units reads out the position data from the position detecting means with the processing timing inherent to the unit, and independently controls the corresponding drive control unit on the basis of the position data. In addition to the timing error corresponding to one cycle of the operation clock signal, there appears a further timing error which corresponds to one reading cycle. When there is an abnormality in the position data received by one drive control commanding unit, the synchronous operation is continued while only this drive control commanding unit is out of synchronization.

In addition, the conventional example of the synchronous system shown in FIG. 14 can detect the timing cut error only when the external clock signal or the reception signal is not supplied from an external unit. Even when the timing of receiving the reception signal or the external clock signal of the master is deviated from that of the slave so that the master and the slave are deviated in synchronous timing, therefore, the asynchronous timing can not be detected and the operating timing of the master is made different from that of the slave with the result that the synchronous operation can no longer be obtained.

SUMMARY OF THE INVENTION

The invention to solve the aforesaid problems. Accordingly, it is an object of the invention to provide a drive control commanding unit which, when plural such units constitute a system, can configure the system as a synchronous system wherein the plural units can be operated synchronously or free from synchronism deviation, or which, when a single set of position detecting means and plural such units constitute a system, can configure the system as a synchronous system wherein the plural units can be operated synchronously or free from synchronism deviation only when all the units normally receive position data from the position detecting means.

The drive control commanding unit according to the invention comprises: interruption generating means for outputting an interruption signal at every cycle of a operation clock signal generated by operation clock generating means; synchronous timing signal transmitting means for, only when the unit is operated as the first drive control commanding unit, outputting a synchronous timing signal based on the operation clock signal; synchronous control means for, only when the unit is operated as the second drive control commanding unit, outputting a synchronous operation starting signal based on an error state signal indicative of a synchronous operation ready state and a synchronous state, and the synchronous timing signal received from the first drive control commanding unit; synchronous check means for judging whether the operation of the second drive control commanding unit is synchronous with the operation of the first drive control commanding unit; error signal generating means for outputting an error signal based on the error state signal; and a microcomputer which, when the unit is operated as the first drive control commanding unit, outputs a movement starting signal and conducts a synchronous control, and which, when the unit is operated as the second drive control commanding unit, conducts a synchronous control in accordance with an input of a movement starting signal.

Furthermore, the drive control commanding unit according to the invention comprises: latch means for latching the value of count means at the instant when a synchronous timing signal is changed in level, the count means dividing a clock signal output from a crystal oscillator into 1/N portions to generate an operation clock signal; and synchronous check means for comparing the latched contents of the latch means with a previously set value to check to see whether the synchronization is normal or not.

Furthermore, the synchronous control system for drive control commanding units according to the invention comprises: a first drive control commanding unit which outputs a synchronous timing signal and movement starting signal to a second drive control commanding unit; and a second drive control commanding unit which synchronizes an operation clock signal with the first drive control commanding unit based on the synchronous timing signal received from the first drive control commanding unit, and which executes a synchronous operation based on the received movement starting signal.

Furthermore, the drive control commanding unit according to the invention comprises: a microcomputer which, when the unit is used as a first drive control commanding unit, outputs a movement starting signal and executes a synchronous operation, and which, when the unit is used as a second drive control commanding unit, in response to an input of a movement starting signal; interruption generating means for outputting an interruption signal to the microcomputer at every cycle of an operation clock signal generated by operation clock generating means; parallel/serial data converting means for, when the unit is operated as a first drive control commanding unit, converting parallel data from the microcomputer into serial data; serial/parallel data converting means for, when the unit is operated as a second drive control commanding unit, converting serial data received from the first drive control commanding unit into parallel data which can be handled in the microcomputer; shift clock signal generating means for outputting a shift clock signal which provides the timing at which the parallel/serial data converting means or the serial/parallel data converting means transmits or receives the serial data; and code comparing means for, when the unit is operated as the second drive control commanding unit, comparing serial data received doubly with each other to check to see whether there is an abnormality or not, and for recognizing an operation mode for switching an operation state from an asynchronous operation to a synchronous operation or vice versa.

Furthermore, the drive control commanding unit according to the invention comprises: interruption generating means for outputting an interruption signal to the microcomputer at every cycle of an operation clock signal generated by operation clock generating means; synchronous timing signal transmitting means for, only when the unit is operated as a first drive control commanding unit, outputting a synchronous timing signal based on the operation clock signal; synchronous control means for, only when the unit is operated as a second drive control commanding unit, outputting a synchronous operation starting signal based on an error state signal indicative of a synchronous operation ready state and a synchronous state, and the synchronous timing signal received from the first drive control commanding unit; synchronous check means for judging to see whether the operation of the second drive control commanding unit is synchronous with the operation of the first drive control commanding unit; error signal generating means for outputting an error signal based on the error state signal; parallel/serial data converting means for outputting a request signal requesting position detecting means to transmit position data in accordance with request data from the first drive control commanding unit; serial/parallel data converting means for converting the position data in a serial form received from position detecting means, into parallel data; communication check means for checking to see whether the position data is normally input or not.

Furthermore, in the drive control commanding unit according to the invention, when a communication error occurs in a second drive control commanding unit, error signal generating means and an error signal which are used in the synchronous check are commonly used in order to notify the occurrence of the communication error to a first drive control commanding unit.

Furthermore, a synchronous control system for drive control commanding units according to the invention comprises: a first drive control commanding unit which outputs a synchronous timing signal and a movement starting signal to a second drive control commanding unit, outputs a request signal to position detecting means, and executes a synchronous operation in synchronism with position data from the position detecting means; and a second drive control commanding unit which synchronizes an operation clock signal with the first drive control commanding unit based on the synchronous timing signal received from the first drive control commanding unit, and executes a synchronous operation in synchronism with the received movement starting signal, and the position data from the position detecting means.

According to the invention, the synchronous timing signal transmitting means outputs the synchronous timing signal based on the operation clock signal, only when the unit is operated as a first drive control commanding unit, and the synchronous control means outputs the synchronous operation starting signal based on the error state signal indicative of a synchronous operation ready state and a synchronous state, and the synchronous timing signal received from the first drive control commanding unit, only when the unit is operated as a second drive control commanding unit. Therefore, the operation clock signal of the second drive control commanding unit can be generated at the same timing as that of the first drive control commanding unit.

Furthermore, the latch means for latching the value of count means for dividing a clock signal output from a crystal oscillator into 1/N portions to generate the operation clock signal, at the instant when the synchronous timing signal is changed in level, and the synchronous check means for comparing the latched contents of the latch means with a previously set value to check to see whether the synchronization is normal or not are provided. Therefore, it is possible to judge whether the operation clock signal of the second drive control commanding unit is deviated in synchronism from that of the first drive control commanding unit.

Furthermore, a microcomputer which, when the unit is operated as a first drive control commanding unit, outputs a movement starting signal and conducting a synchronous control, and which, when the unit is operated as a second drive control commanding unit, conducts a synchronous control in accordance with an input of a movement starting signal, the interruption generating means for outputting an interruption signal to the microcomputer at every cycle of the operation clock signal generated by the operation clock generating means, the parallel/serial data converting means for, when the unit is operated as the first drive control commanding unit, converting parallel data from the microcomputer into serial data, the serial/parallel data converting means for, when the unit is operated as the second drive control commanding unit, converting serial data received from the first drive control commanding unit into parallel data which can be handled in the microcomputer, the shift clock signal generating means for outputting a shift clock signal which provides the timing at which the parallel/serial data converting means or the serial/parallel data converting means transmits or receives the serial data, and the code comparing means for, when the unit is operated as the second drive control commanding unit, comparing serial data received doubly with each other to check to see whether there is an abnormality or not, and for recognizing an operation mode for switching an operation state from an asynchronous operation to a synchronous operation or vice versa are provided. Therefore, the operation states of drive control commanding units which are currently operated can be switched over from the asynchronous operation to the synchronous operation or vice versa.

Furthermore, the first drive control commanding unit which outputs the synchronous timing signal and the movement starting signal to the second drive control commanding unit, which outputs the request signal to the position detecting means, and which executes a synchronous operation in synchronism with position data from the position detecting means, and the second drive control commanding unit which synchronizes an operation clock signal with the first drive control commanding unit based on the synchronous timing signal received from the first drive control commanding unit, and which executes a synchronous operation in synchronism with the movement starting signal and position data from the position detecting means are provided. Therefore, a plurality of drive control commanding units can be operated in synchronism with the rotation of a single set of position detecting means which outputs position data.

In the drive control commanding unit according to the invention, when a communication error occurs in a second drive control commanding unit, error signal generating means and an error signal which are used in the synchronous check are commonly used in order to notify the occurrence of the communication error to a first drive control commanding unit. Therefore, the circuit can be simplified in configuration and wiring can be reduced in number.

In a synchronous control system comprising one position detecting means and a plurality of drive control commanding units, according to the synchronous control method wherein, when a communication error occurs in a first drive control commanding unit or a second drive control commanding unit, the first drive control commanding unit retransmits a request signal to the position detecting means, whereby only the drive control commanding unit wherein the communication error occurs is allowed to newly receive a position data, the drive control commanding unit wherein the communication error occurs can immediately receive normal position data. Therefore, synchronism deviation in the case of communication error can be suppressed to a minimum level, and a normal synchronous operation which is free from synchronism deviation can rapidly be restored.

DESCRIPTION OF THE PREFERRED EMBODIMENTS

Embodiment 1

Figure 1:
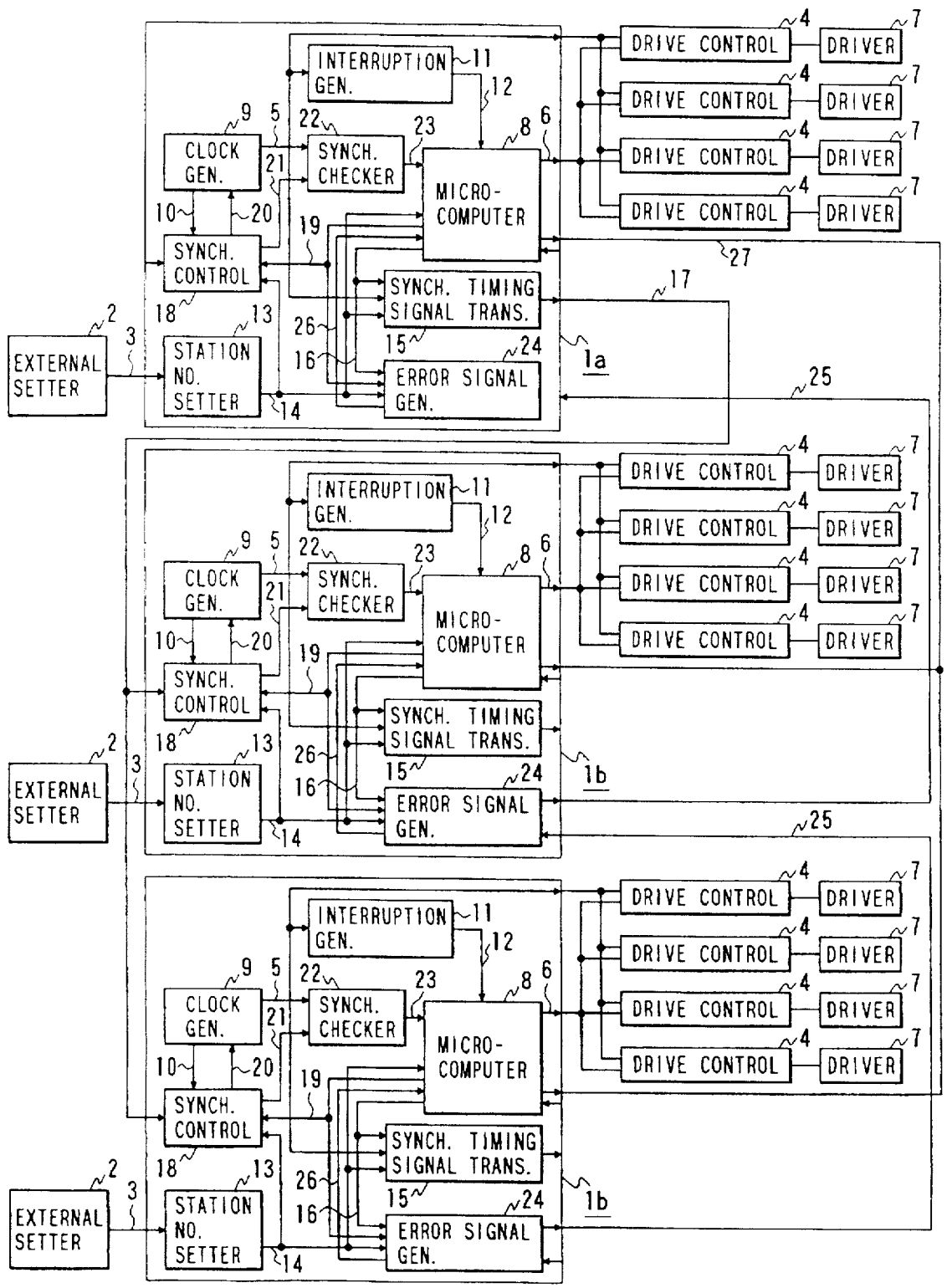
FIG. 1 is a block diagram of the synchronous system for drive control commanding units according to the invention.

FIG. 1 is a block diagram showing an embodiment of the synchronous control system for a plurality of drive control commanding units. In the embodiment, the same drive control commanding unit can be used as either of a first drive control commanding unit (hereinafter, referred to as "master"), or a second drive control commanding unit (hereinafter, referred to as "slave"). In the figure, 1a designates a drive control commanding unit which is operated as a master, and 1b designates a drive control commanding unit which is operated as a slave. The reference numeral 2 designates an external setter through which the operator can set a station number indicating whether the corresponding drive control commanding unit 1a or 1b is operated as a master or an nth-rank slave. The external setter 2 outputs an external setting signal 3 to the respective drive control commanding units 1a and 1b. The reference numeral 4 designates a drive control unit which controls the motion of a drive unit 7 in accordance with an operation clock signal 5 and a command value 6 given from the corresponding drive control commanding unit 1a or 1b.

The reference numeral 8 designates a microcomputer which controls the operation of the drive control commanding unit 1a or 1b. 9 designates an operation clock generator which generates the operation clock signal 5 for carrying out the motion control, and 11 designates an interruption generator which receives the operation clock signal 5 and outputs an interruption signal 12 to the microcomputer 8. The reference numeral 13 designates a station number setting unit which receives the external setting signal 3 and outputs a station number setting signal 14 indicative whether the drive control commanding unit 1a or 1b is operated as a master (hereinafter, this mode is referred to as "master mode") or as a slave (hereinafter, this mode is referred to as "slave mode").

The reference numeral 15 designates a synchronous timing signal transmitter which operates only when the master mode is set, and which outputs a synchronous timing signal 17 on the basis of the operation clock signal 5 and a synchronous timing output permitting signal 16 given from the microcomputer 8. The reference numeral 18 designates a synchronous controller which operates only when the slave mode is set, and which outputs a synchronous operation starting signal 20 and a synchronous check trigger signal 21 on the basis of the synchronous timing signal 17 received from the master drive control commanding unit 1a, and an error state signal 19 output from the microcomputer 8. The reference numeral 22 designates a synchronous checker which checks the synchronous state on the basis of the operation clock signal 5 and the synchronous check trigger signal 21, and which outputs a synchronous state signal 23.

The reference numeral 24 designates an error signal generator which, in the master mode, receives an error signal 25 from the slave drive control commanding unit 1b and notifies the occurrence of the error in the slave, to the microcomputer 8 by means of a slave error signal 26, and, in the slave mode, outputs the error signal 25 on the basis of the station number setting signal 14 and the error state signal 19. The reference numeral 27 designates a movement starting signal for simultaneously starting the synchronous operation.

Figure 2:
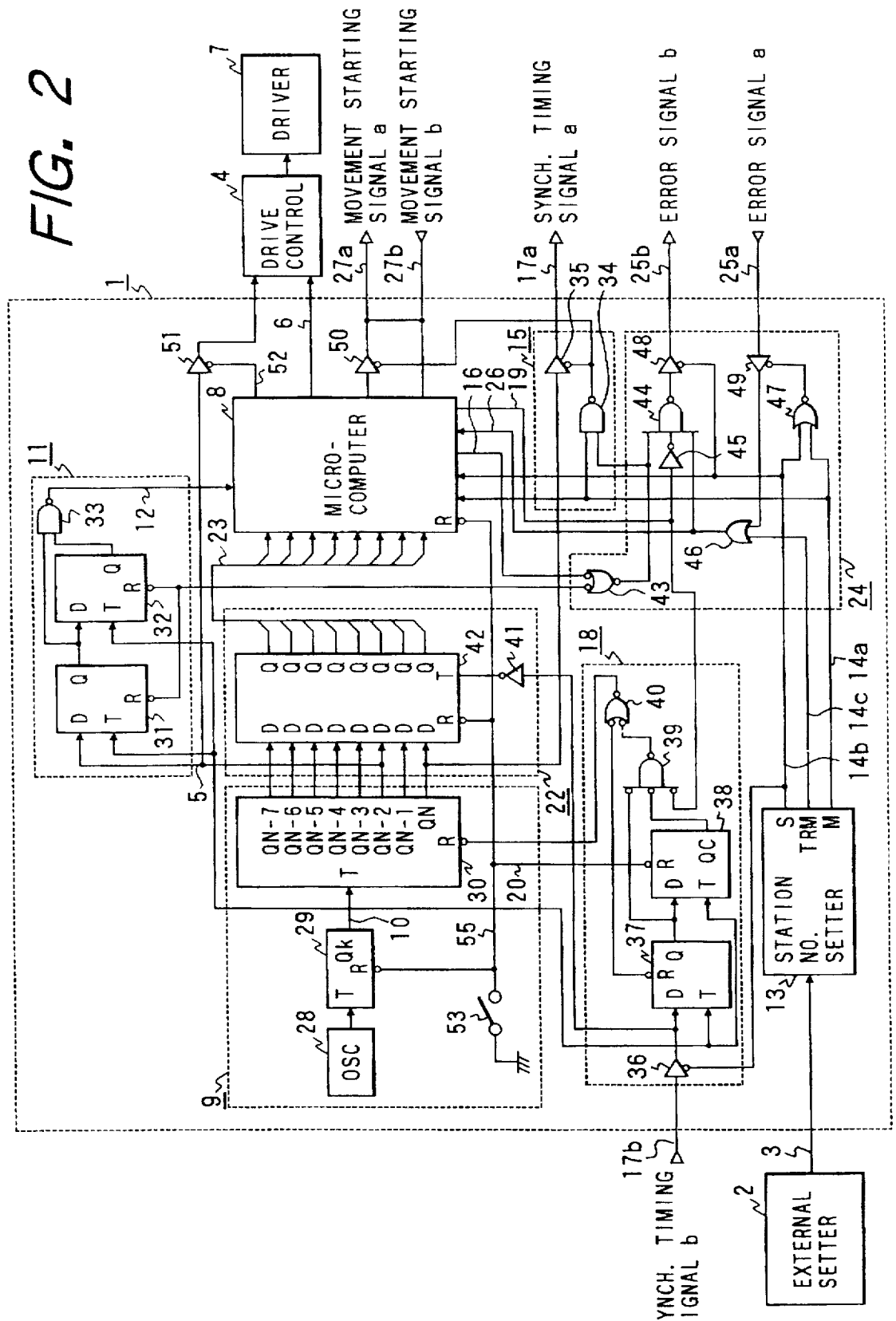
FIG. 2 is a circuit diagram of the drive control commanding unit according to the invention.

FIG. 2 shows an example of a circuit which realizes the block of the drive control commanding unit 1 (1a, 1b) constituting the synchronous control system of FIG. 1. The operation clock generator 9 consists of a crystal oscillator 28 and counters 29 and 30. The counter 29 divides a clock signal output from the crystal oscillator 28 by 2 to generate an internal clock signal 10. When the synchronous operation starting signal 20 input to the reset terminal of the counter 30 is at a HIGH level, the counter 30 divides the internal clock signal 10 by $2^{10}$ to generate the operation clock signal 5.

The interruption generator 11 consists of flip flops 31 and 32 and a NAND circuit 33. In synchronism with the rise of the operation clock signal 5, the interruption generator sets the interruption signal 12 to be a LOW level for 1 clock pulse period of the internal clock signal 10 to issue an interruption request to the microcomputer 8. The synchronous timing signal transmitter 15 consists of a NAND circuit 34 and a 3-state gate 35, and outputs a synchronous timing signal 17a in case of the master mode.

The synchronous controller 18 consists of a 3-state gate 36, flip flops 37 and 38, an OR circuit 39 and an AND circuit 40. In the slave mode, the synchronous controller sets the synchronous operation starting signal 20 to be a LOW level for 1 clock pulse period of the internal clock signal 10 in synchronism with the fall of a synchronous timing signal 17b. The synchronous checker 22 consists of a NOT circuit 41 and a latch circuit 42, and latches the value of the counter 30 at the instant when the synchronous timing signal 17b falls. The error signal generator 24 consists of AND circuits 43 and 44, a NOT circuit 45, an OR circuit 46, a NOR circuit 47 and 3-state gates 48 and 49, and outputs an error signal 25a to the drive control commanding unit of the previous stage on the basis of the synchronous timing output permitting signal 16, the error state signal 19 and an error signal 25b supplied from the slave drive control commanding unit 1b of the subsequent stage.

A movement starting signal 27a is output from the microcomputer 8 in the case of the master mode, and input at the same time into all the drive control commanding units 1a and 1b via a 3-state gate 50. The reference numeral 51 designates a 3-state buffer which controls the output of the operation clock signal for the drive control units 4 in accordance with an operation clock output permitting signal 52 from the microcomputer 8, and 53 designates a reset switch which, when the power source of the drive control commanding unit or an external reset switch is turned on, sets a reset signal to be a LOW level to reset the components.

Figure 3A:
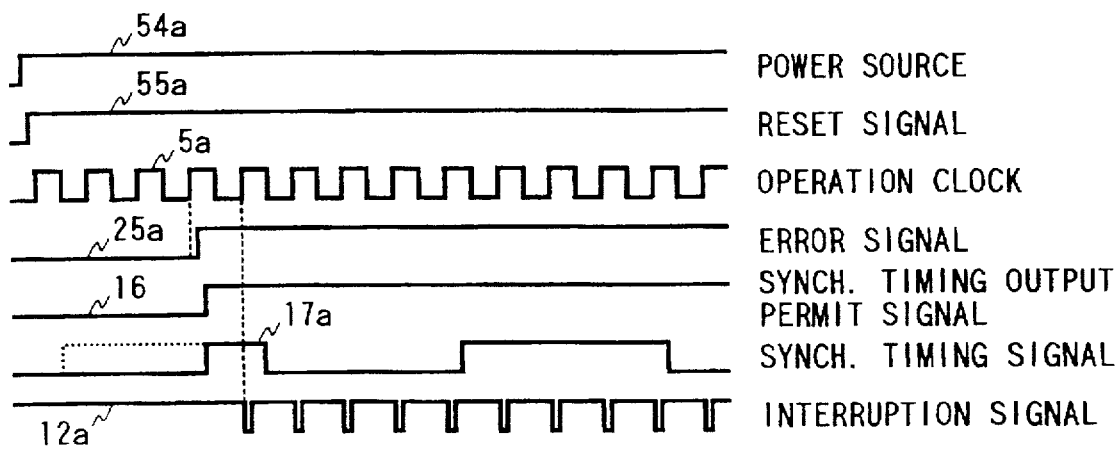
FIGS. 3A to 3C are waveform diagrams illustrating the operation of the drive control commanding unit according to the invention.
Figure 3B:
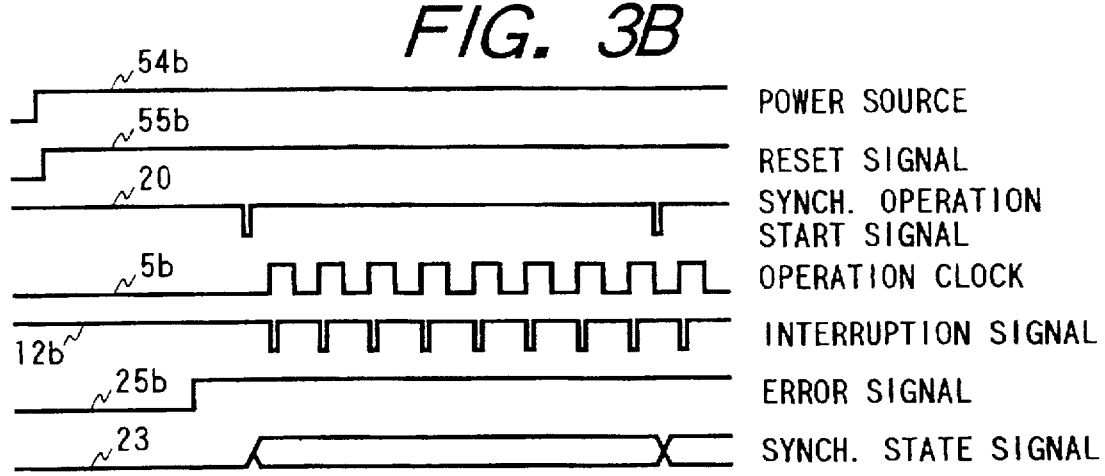
Figure 3C:
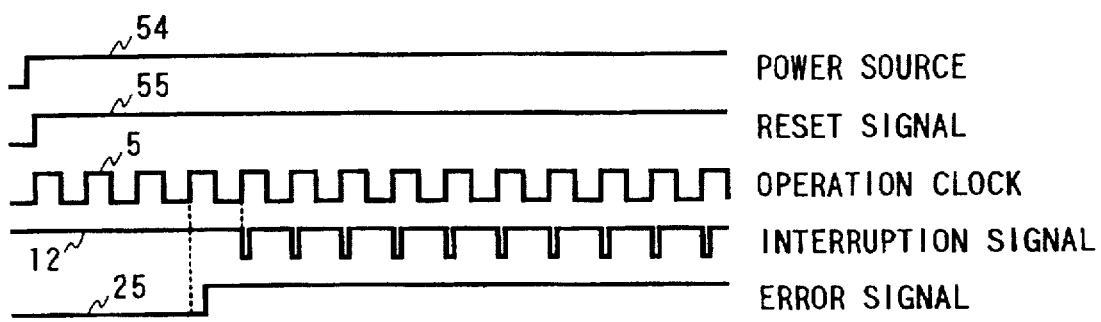
Figure 4:
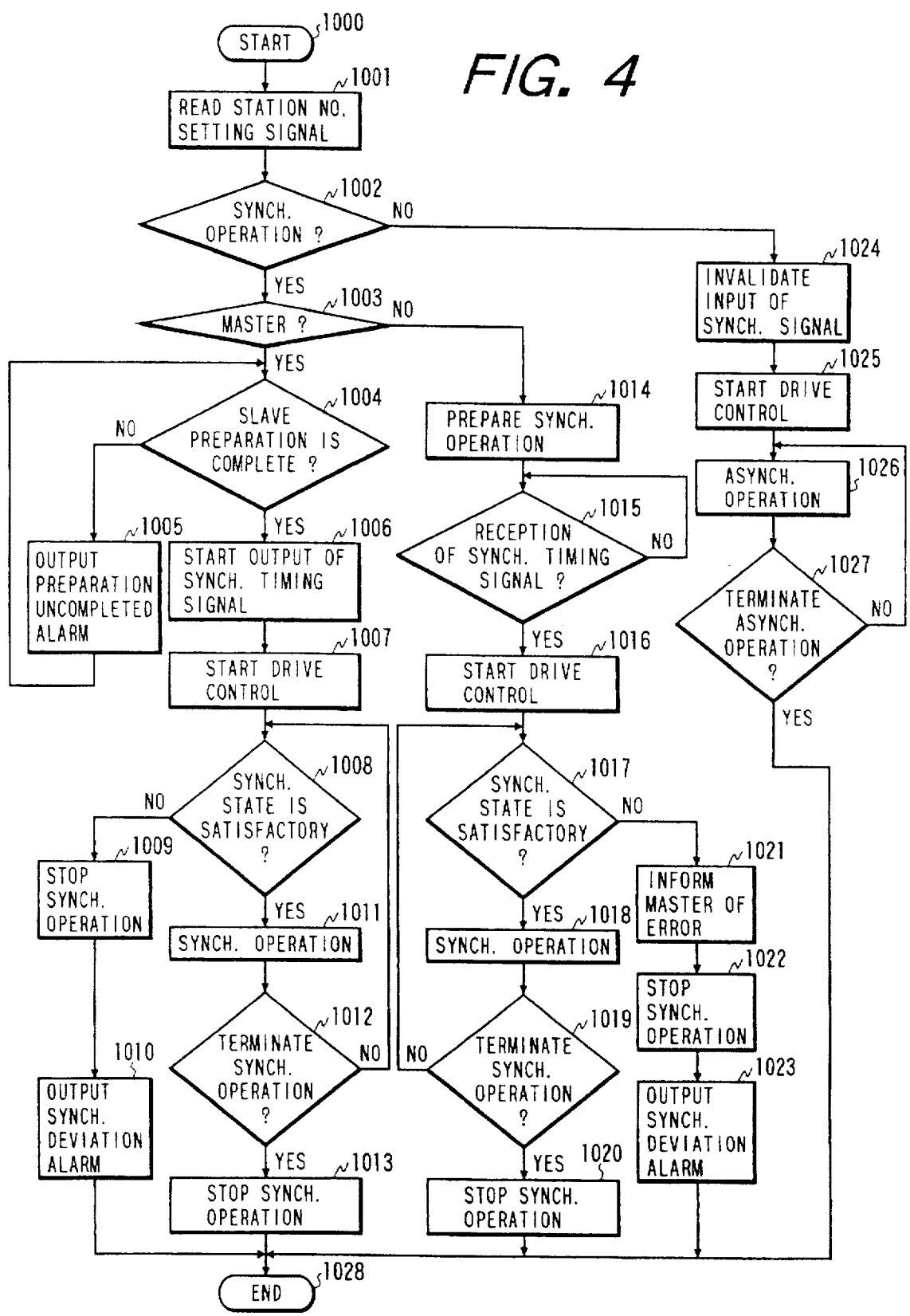
FIG. 4 is a flow chart showing a method of controlling a synchronous operation according to the invention.

Next, the operation of the drive control commanding unit of FIG. 2 in the case where the unit is applied to Embodiment 1 of FIG. 1 will be described with reference to FIGS. 1 to 4. FIGS. 3A–3C are wave form diagrams illustrating the operation of the drive control commanding unit according to the invention. FIG. 3A shows the operation of the master in the case of the synchronous operation, FIG. 3B shows that of a slave in the case of the synchronous operation, and FIG. 3C shows that of the slave in the case of the asynchronous operation. FIG. 4 is a flow chart of a program of controlling the synchronous operation of the drive control commanding unit according to the invention.

First, the case of carrying out the synchronous operation will be described. When a power source 54a of the drive control commanding unit 1a to be operated as a master for controlling the slaves to conduct the synchronous operation is turned on, a reset signal 55a becomes a HIGH level. This causes the microcomputer 8 to start the execution of the program for controlling the synchronous operation. When the operator sets the use as the master drive control commanding unit or an nth-rank slave drive control commanding unit to the external setter 2, the external setter 2 outputs the external setting signal 3 indicative of the station number. The station number setting unit 13 judges the contents of the external setting signal 3. When the unit has been set as the master, the station number setting unit 13 makes a station number setting signal 14a for the master mode to be a HIGH level, a station number setting signal 14b for the slave mode to be a LOW level, and a station number setting signal 14c for the terminal station to be a LOW level.

The microcomputer 8 reads out at Step 1001 these station number setting signals 14a through 14c. At Step 1002, if either of the station number setting signals 14a and 14b is a HIGH level, the microcomputer 8 judges that the synchronous operation is to be conducted, and, if both the station number setting signals 14a and 14b are a LOW level, judges that the asynchronous operation is to be conducted. The microcomputer 8 executes Steps 1024 through 1027 in the case of the asynchronous operation, and Steps 1003 through 1023 in the case of the synchronous operation. At Step 1003, the microcomputer 8 judges which is a HIGH level, the station number setting signal 14a or 14b. If the station number setting signal 14a of the master is a HIGH level, the unit is judged as the master, and, if the station number setting signal 14b of the slave is a LOW level, the unit is judged as the slave. When the unit is used as the master, Step 1004 is executed, and, when the unit is used as the slave, Step 1014 is executed.

First, the processing for using the drive control commanding unit as the master will be described. When the power source of the slave drive control commanding unit 1b is turned on and preparation for the synchronous operation such as the station number setting is completed, the error signal 25a which is input into the error signal generator 24a of the master from the error signal generator 24b of the slave becomes a HIGH level. At Step 1004, the microcomputer 8 judges the level of the error signal 25a. During the period when the error signal 25a is a LOW level and the preparation is not completed, a preparation uncompleted alarm is output at Step 1005 inside the microcomputer 8, and the process returns to Step 1004 to await the completion of the preparation.

When the error signal 25a reaches a HIGH level, the microcomputer 8 sets at Step 1006 the synchronous timing output permitting signal 16 to be a HIGH level to permit the output of the synchronous timing signal 17a. This enables the 3-state gate 35 to conduct the output operation so that the synchronous timing signal 17a is output to the slave drive control commanding unit 1b from the 3-state gate 35. The operation clock output permitting signal 52 is made a LOW level at Step 1004, and hence the 3-state gate 51 is enabled to conduct the output operation so that the operation clock signal 5a is supplied to the drive control units 4. At this time, the interruption signal 12a is generated in synchronism with the rise of the operation clock signal 5a which is input into the interruption generator 11. The interruption signal 12a is input into the microcomputer 8 which in turn executes the processing for controlling the positions and speeds of the drive control units 4.

At Step 1008, the error signal 25a is checked to see whether it remains to be a HIGH level or not, whereby the synchronous state of the slave drive control commanding unit 1b is judged whether it is satisfactory or not. If the synchronous state is not satisfactory and the error signal 25a is a LOW level, the microcomputer 8 stops at Step 1009 the synchronous operation, and then outputs a synchronous deviation alarm inside the microcomputer 8. The synchronous deviation alarm shows that there occurs a synchronous deviation in the slave. Thereafter, the microcomputer 8 ends the processing.

If it is judged that the error signal 25a is a HIGH level and the synchronous state is satisfactory, the microcomputer 8 executes the control program of synchronous operation of Step 1011. The microcomputer 8 judges at Step 1012 whether the synchronous operation is to be terminated or not. If the control program of synchronous operation is ended and the synchronous operation is to be terminated, the microcomputer 8 sets at Step 1013 the synchronous timing output permitting signal 16 to be a LOW level to stop the output of the synchronous timing signal 17a to the slave drive control commanding unit 1b, and then ends the processing after stopping the synchronous operation.

Next, the processing for using the drive control commanding unit as a slave will be described. When the power source 54a of the slave drive control commanding unit 1b is turned on to make the reset signal 55b a HIGH level, the microcomputer 8 starts the execution of the program of controlling the synchronous operation. The station number setting unit 13 judges the contents of the external setting signal 3. If the unit is set as a slave, the station number setting signal 14a of the master mode is set to be a LOW level, and the station number setting signal 14b of the slave is set to be a HIGH level. In the case where the unit is a slave at the terminal station, there is no slave in the subsequent stage and hence no error signal is input. Therefore, the input of the error signal must be invalidated. Consequently, the station number setting signal 14c for the terminal station is set to be a HIGH level so that the output of the OR circuit 47 in the error signal generator 24 is kept at a HIGH level irrespective of the input of the error signal 25b. This can make the input into the 3-state gate 50 ineffective. Steps 1002 and 1003 are similar to those in the case where the unit is used as the master, and therefore their description is omitted.

At Step 1014, the microcomputer 8 makes the synchronous timing output permitting signal 16 a LOW level until preparation for the synchronous operation is completed after the power source of the slave drive control commanding unit 1b is turned on, so that the error signal 25b output from the error signal generator 24b is set to be a LOW level, thereby notifying the master drive control commanding unit 1a that preparation for the synchronous operation has not been completed. When preparation for the synchronous operation is completed, the synchronous timing output permitting signal 16 is made a HIGH level so that the error signal 25b is set to be a HIGH level, thereby notifying the master drive control commanding unit 1a that preparation for the synchronous operation has been completed.

Next, the unit awaits at Step 1015 the input of the synchronous timing signal 17b from the master drive control commanding unit 1a. When the synchronous controller 18 receives the synchronous timing signal 17b, the synchronous controller 18 makes the synchronous operation starting signal 20 to be a LOW level for 1 clock pulse period of the internal clock signal 10 in synchronism with the fall of the synchronous timing signal 17b. This synchronous operation starting signal 20 causes the count value of the counter 30 of the operation clock generator 9 to be reset, whereby the generation of the operation clock signal 5b is started with the time delay which is shorter than 1 clock pulse period of the internal clock signal 10 with respect to the fall of the synchronous timing signal 17b of the master.

When the operation clock output permitting signal 52 is made a LOW level, the 3-state gate 51 is enabled to conduct the output operation, and hence the operation clock signal 5b is supplied to the drive control units 4. At this time, the interruption signal 12b is generated in synchronism with the rise of the operation clock signal 5b which is input into the interruption generator 11. The interruption signal 12b is input into the microcomputer 8. The microcomputer 8 executes at Step 1016 the processing for controlling the positions and speeds of the drive control units 4.

At Step 1017, the microcomputer 8 compares the count value which was latched by the latch circuit 42 of the synchronous checker 22 just before the reset of the counter 30, with the minimum and maximum values of the synchronism deviation tolerance which is previously set inside the microcomputer 8, and judges whether the synchronism deviation is within the tolerance or the synchronous state is satisfactory or not. If the synchronous state is satisfactory, the error state signal 19 is kept to be a LOW level so that the error signal 25b for notifying the error occurrence to the master drive control commanding unit 1a is made a HIGH level, and Step 1018 is executed to conduct the synchronous operation. It is judged at Step 1019 whether the synchronous operation is to be continued or to be terminated. If the operation is to be terminated, the processing for stopping the synchronous operation is executed at Step 1020 to end the processing.

In a usual operation, the synchronization of the slave drive control commanding units 1b can sufficiently be attained on the basis of the synchronous timing signal 17b. However, the synchronism deviation may be caused to exceed the tolerance by the following reasons: a contact failure occurs in a cable; the period of the clock signal generated by the crystal oscillator 28 and the counters 29 and 30 fails to be within the allowable range because of the ambient temperature beyond the specified range; the wave form of the signal is dulled by a cable; and the wave form of the clock signal is disturbed by an external noise. When the synchronous state becomes insufficient, the microcomputer 8 sets at Step 1021 the error state signal 19 to be a HIGH level so that the error signal 25b is made a LOW level, thereby notifying the occurrence of an error to the master drive control commanding unit 1a. At this time, since the error state signal 19 is set to be a HIGH level as described above, the synchronous operation starting signal 20 is made a HIGH level in the synchronous controller 18, and the reset of the counter 30 is kept to be canceled, whereby the timing detection based on the synchronous timing signal 17b is aborted so that the operation clock signal 5 is output on the basis of the internal clock signal 10 and irrespective of the synchronous timing signal 17b. This causes the slave drive control commanding units 1b to start the operation which is asynchronous with that of the master drive control commanding unit 1a. Furthermore, the microcomputer 8 stops at Step 1022 the synchronous operation, and then internally outputs at Step 1023 the synchronous deviation alarm indicating that there occurs synchronism deviation. Thereafter, the processing is terminated.

When synchronism deviation occurs, the degree of the synchronism deviation may be estimated and corrected by a software process using the current speed and position. However, such a technique can not again realize the perfect synchronization and allows the operation to be continued while slight deviation is left unsettled. In the embodiment, when synchronism deviation occurs, therefore, the synchronous operation is stopped. When synchronism deviation occurs, the processing is returned to the original point in order to again attain synchronism, and then the processing for synchronization is reexecuted.

Next, the case of carrying out the asynchronous operation will be described. When the power source 54 of the drive control commanding unit 1 (1a, 1b) is turned on, the reset signal 55 becomes a HIGH level. This causes the microcomputer 8 to start the execution of the program of controlling the synchronous operation. When the operator sets the use in the asynchronous operation to the external setter 2, the external setter 2 outputs the external setting signal 3 indicative of the station number. The station number setting unit 13 judges the contents of the external setting signal 3. When the unit has been set so as to conduct the asynchronous operation, the station number setting unit 13 sets a station number setting signal 14a for the master mode to be a LOW level, a station number setting signal 14b for the slave mode to be a LOW level, and a station number setting signal 14c for the terminal station to be a LOW level. The microcomputer 8 reads out at Step 1001 these station number setting signals 14a and 14b. At Step 1002, if both the station number setting signals 14a and 14b are a LOW level, the microcomputer 8 judges that the asynchronous operation is to be conducted.

In the case of the asynchronous operation, the microcomputer 8 sets at Step 1024 the error state signal 19 to be a HIGH level so that the output of the OR circuit 39 in the synchronous controller 18 is made a HIGH level. This causes the synchronous operation starting signal 20 which is the output of the AND circuit 40, to be made a HIGH level so that the input of the synchronous timing signal 17b is invalidated. When the synchronous operation starting signal 20 is made a HIGH level, the operation clock generator 9 outputs the operation clock signal 5 on the basis of the internal clock signal 10. The interruption signal 12 is generated in synchronism with the rise of the operation clock signal 5 which is input into the interruption generator 11. The interruption signal 12 is input into the microcomputer 8. The microcomputer 8 executes at Step 1025 the processing for controlling the positions and speeds of the drive control units 4. The asynchronous operation is executed at Step 1026. It is judged at Step 1027 whether the asynchronous operation is to be continued or to be terminated. If the operation is to be terminated, the processing is ended.

Embodiment 2

Figure 5:
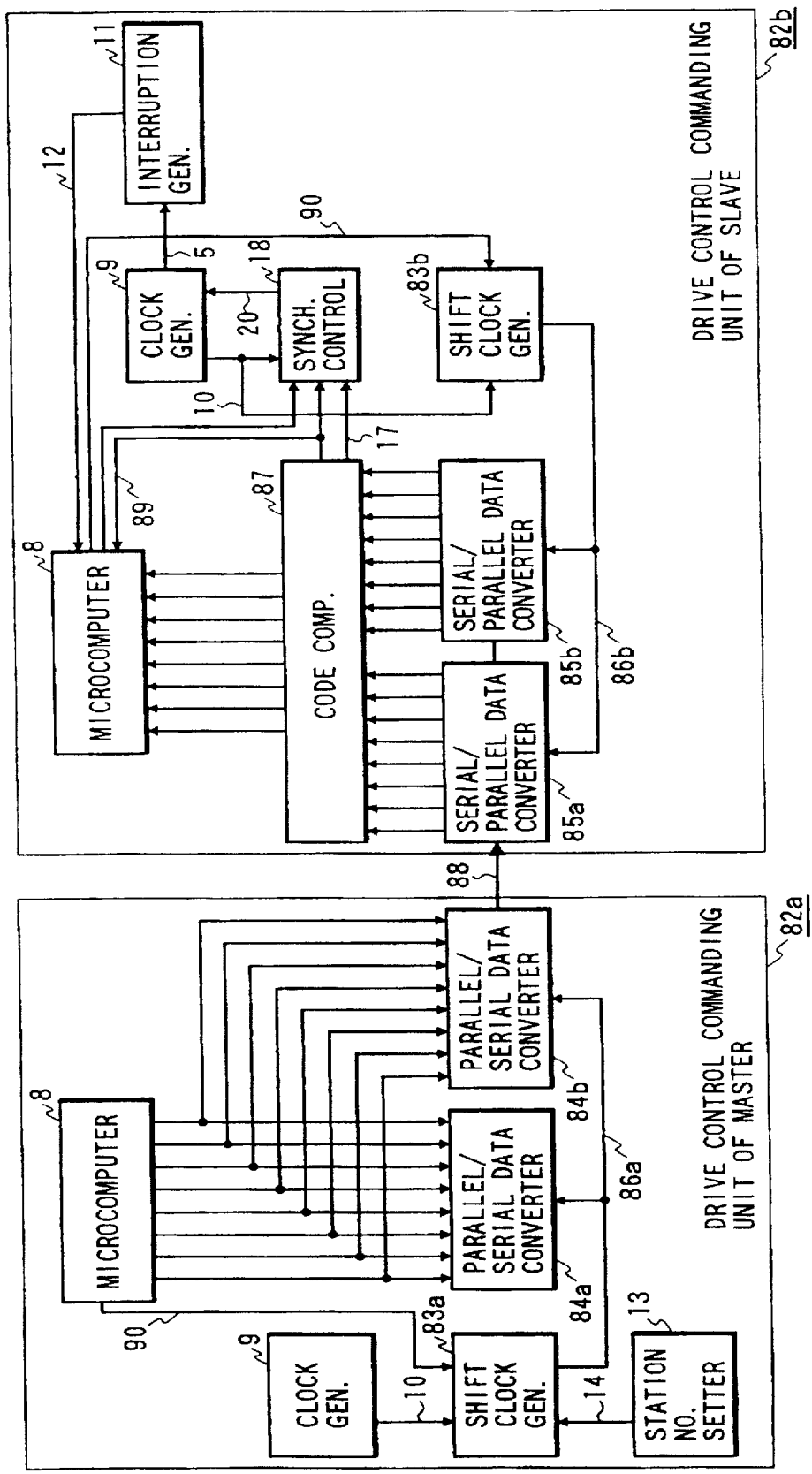
FIG. 5 is a block diagram of a drive control commanding unit having means for switching over the operation mode according to the invention.
Figure 6:
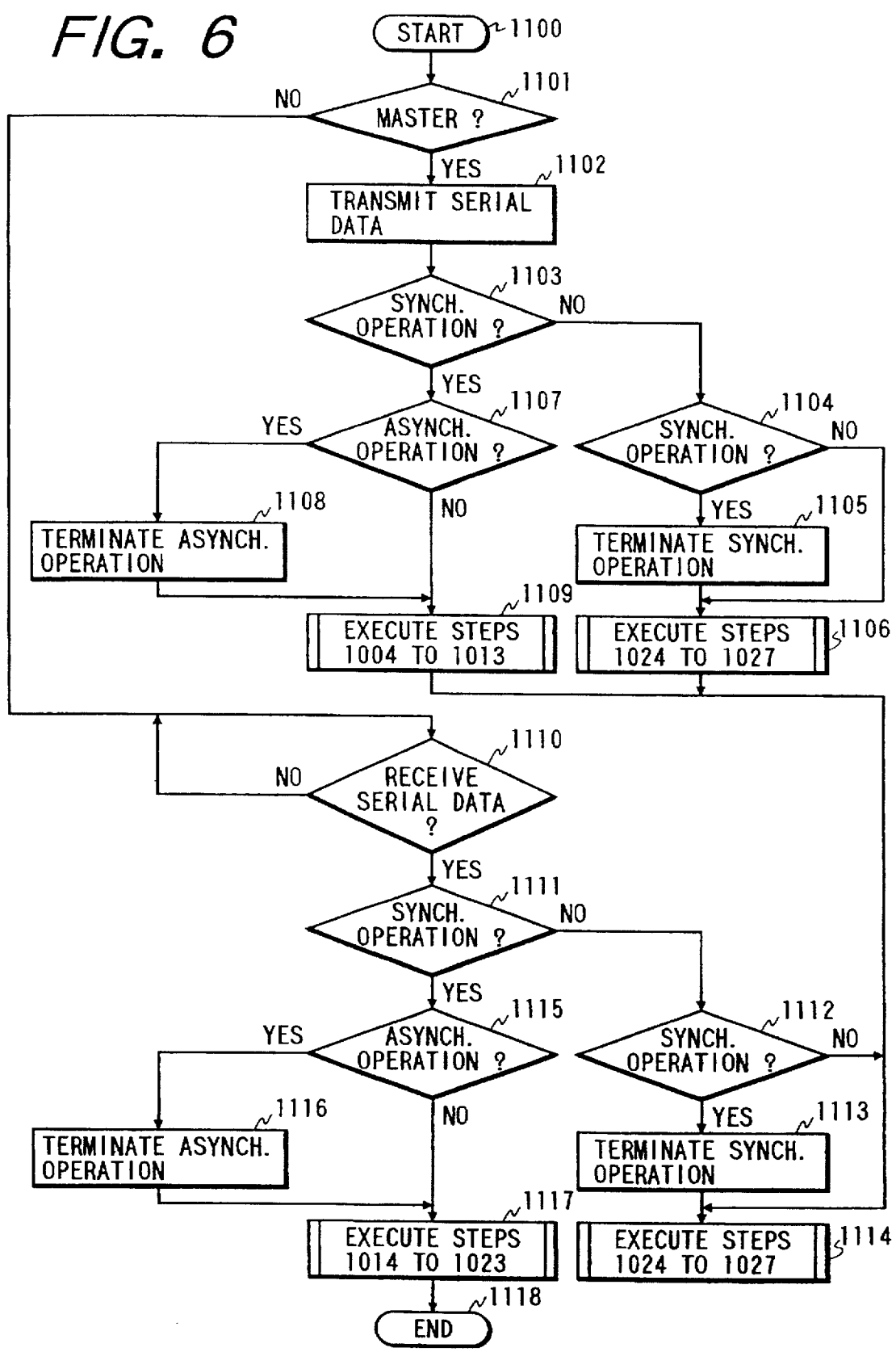
FIG. 6 is a flow chart showing a synchronous control method of the drive control commanding unit according to the invention.
Figure 7:
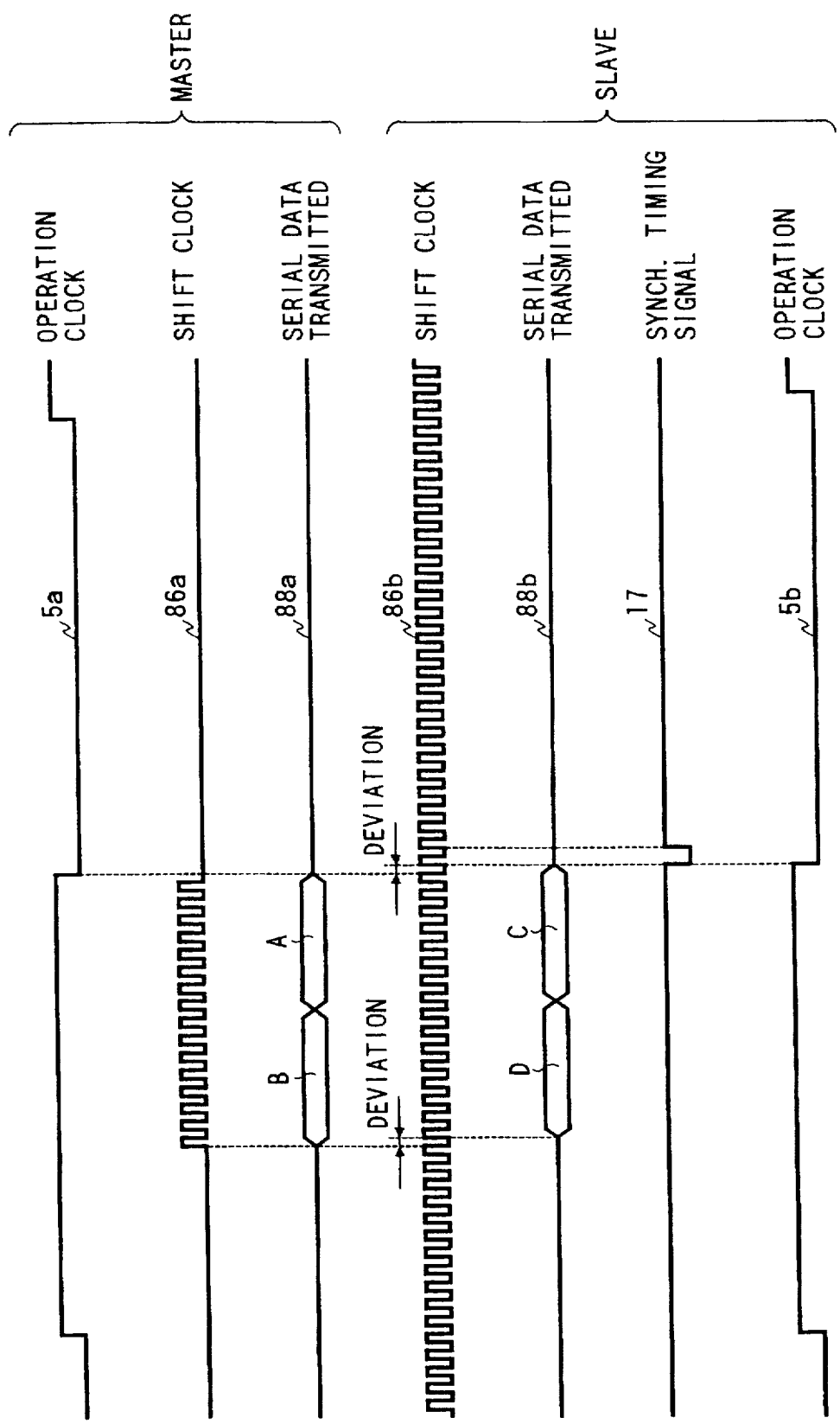
FIG. 7 is a synchronous timing chart of the drive control commanding unit according to the invention.

FIG. 5 is a block diagram of a drive control commanding unit which is an embodiment of the invention and has means for switching over the operation mode, FIG. 6 is a flow chart showing a synchronous control method of the drive control commanding unit of the embodiment, and FIG. 7 is a synchronous timing chart of the drive control commanding unit of the embodiment.

In the foregoing Embodiment 1, the error state signal 19 output from the microcomputer 8 is input into the synchronous controller 18 only when synchronism deviation occurs during the execution of the synchronous operation, and the synchronous operation is switched to the asynchronous operation by changing the error state signal 19 from a LOW level to a HIGH level. In order to attain synchronism, the synchronous timing signal having a clock signal wave form is used. In the embodiment of the drive control commanding unit shown in FIG. 5, the synchronous timing signal is not used for attaining synchronism, and synchronism is attained on the basis of the timing of receiving serial data for transmitting various kinds of information from the master to a slave.

In order to attain synchronism on the basis of the timing of receiving serial data in this way, a shift clock generator 83a, and parallel/serial data converting units 84a and 84b which are operated during the master operation are added to the drive control commanding unit of Embodiment 1. Furthermore, serial/parallel data converting units 85a and 85b, a shift clock generator 83b, and a code comparing unit 87 which are operated during the slave operation are additionally installed. In this configuration, the operation state of a drive control commanding unit 82b which is a slave can be switched over from the asynchronous operation to the synchronous operation or vice versa by a drive control commanding unit 82a which is the master in the following manner. Serial data 88 supplied from the master drive control commanding unit 82a to the slave drive control commanding unit 82b are converted into parallel data by the serial/parallel data converting units 85a and 85b. The code comparing unit 87 judges what operation state is indicated by the contents of the parallel data, and at the same time generates the synchronous timing signal 17 in accordance with the timing of receiving the parallel data. The synchronous controller 18 switches over the timing of supplying the operation clock signal, on the basis of an operation mode signal 89 output from the code comparing unit 87.

Next, the operation will be described in detail with reference to FIGS. 6 and 7. In FIG. 6, it is assumed that the processing of Steps 1001 and 1002 of FIG. 4 has already been executed, namely, the setting for the use as the master drive control commanding unit or an nth-rank slave drive control commanding unit has been ended, and the drive control commanding units are operating in a synchronous or asynchronous manner. At Step 1101, each unit judges whether the unit is the master or a slave. If the unit is used as the master, Steps 1102 through 1108 are executed, and, if the unit is used as a slave, Steps 1110 through 1117 are executed.

First, the processing for using the drive control commanding unit as the master will be described. The microcomputer 8 outputs at Step 1101 parallel data having a checksum bit, to the parallel/serial data converting units 84a and 84b which are cascade-connected, whereby the same parallel data are set in the parallel/serial data converting units 84a and 84b. After the parallel data are set, the microcomputer 8 outputs a shift clock output permitting signal 90 in accordance with the timing when the serial data 88 are to be transmitted. The shift clock output permitting signal 90, and the station number setting signal 14 output from the station number setting unit 13 are input into the shift clock generator 83a. The shift clock generator 83a judges whether the station number setting signal 14 is in the preset state for selecting the master operation or in that for selecting the slave operation, and whether the shift clock output signal 90 is in the permitted state or not. If the station number setting signal 14 is in the preset state for selecting the master operation and the shift clock output permitting signal 90 is in the permitted state, an integer-multiplication clock signal having a period which is an integer multiple of the period of the internal clock signal 10 is generated in synchronism with the internal clock signal 10.

In a usual operation, when various data are to be transmitted between the master and the slave, in order to transmit data preset in the cascade-connected parallel/serial data converting units 84a and 84b as the serial data 88, the integer-multiplication clock signal having the clock pulse number corresponding to the length which is twice the length of the data to be transmitted is output as a shift clock signal 86a. The shift clock signal 86a is supplied to the parallel/serial data converting units 84a and 84b so that the data of the parallel/serial data converting units 84a and 84b are sequentially shifted at each clock pulse of the system clock signal to the output side, whereby the data of the master drive control commanding unit 82a are transmitted as the serial data 88 to the slave drive control commanding unit 82b.

On the other hand, when the synchronous timing is to be attained on the basis of the serial data 88, as shown in FIG. 7, the integer-multiplication clock signal is output as the shift clock signal 86a during the period from the time anteceding the fall of the operation clock signal 5a by the clock pulse number corresponding to the length which is twice the length of the data to be transmitted, to the fall of the operation clock signal 5a. This allows the timing of the fall of the operation clock signal 5a to be synchronized with that of the stop of the supply of the shift clock signal 86a. The shift clock signal 86a is supplied to the parallel/serial data converting units 84a and 84b so that the data of the parallel/serial data converting units 84a and 84b are transmitted as the serial data 88 from the master drive control commanding unit 82a.

In the transmitted serial data 88, the data A which are earlier transmitted are the data of the parallel/serial data converting unit 84b, and the data B which are later transmitted are the data of the parallel/serial data converting unit 84a. The serial data 88 to be transmitted are serial data carrying information for switching the operation state from the asynchronous operation to the synchronous operation or vice versa.

Next, the contents of the station number setting signal 14 are checked at Step 1103 to judge whether the operation state is to be switched over from the synchronous operation to the asynchronous operation, or from the asynchronous operation to the synchronous operation. When the former is selected, Steps 1104 through 1106 are executed, and, when the latter is selected, Steps 1107 through 1109 are executed. In the case where the operation state is to be switched over from the synchronous operation to the asynchronous operation, it is judged at Step 1104 whether the operation is in the synchronous operation or not. If the operation is not in the synchronous operation, Step 1106 is executed and then the processing for switching over the operation mode is ended. If the operation is in the synchronous operation, the synchronous operation is stopped at Step 1105, Step 1106 is then executed, and thereafter the processing for switching over the operation mode is ended. At Step 1106, the processing similar to Steps 1024 through 1027 of FIG. 4 is executed.

In the case where the operation state is to be switched over from the asynchronous operation to the synchronous operation, it is judged at Step 1107 whether the operation is in the asynchronous operation or not. If the operation is in the asynchronous operation, the asynchronous operation is stopped at Step 1108, Step 1109 is then executed, and thereafter the processing for switching over the operation mode is ended. If the operation is not in the asynchronous operation, Step 1109 is executed and then the processing for switching over the operation mode is ended. At Step 1109, the processing similar to Steps 1004 through 1013 of FIG. 4 is executed.

Next, the processing for using the drive control commanding unit as a slave will be described. In the case of a slave, when preparation for using the unit as a slave is completed, a shift clock signal 86b is supplied to the cascade-connected serial/parallel data converting units 85a and 85b to prepare for the reception of the serial data 88.

The slave drive control commanding unit 82b awaits at Step 1110 the reception of the serial data 88 from the master drive control commanding unit 82a. When the slave drive control commanding unit 82b receives the serial data 88, the serial data 88 are input into the serial/parallel data converting units 85a and 85b while being sequentially shifted at each clock pulse of the system clock signal, to be converted into parallel data. The parallel data are then input into the code comparing unit 87. When the serial data 88 are received, the data C which are earlier received are input into the serial/parallel data converting unit 85b, and the data D which are later received are input into the serial/parallel data converting unit 85a.

The code comparing unit 87 checks to see whether the contents of the two serial/parallel data converting units 85a and 85b coincide with each other or not, or whether transmission error has occurred or not. If no transmission error has occurred, the parallel data are supplied from the code comparing unit 87 to the microcomputer 8 which in turn judges the contents of the parallel data to use them in various processing. At the same time, the code comparing unit 87 judges whether the parallel data are data for switching the operation state from the asynchronous operation to the synchronous operation or from the synchronous operation to the asynchronous operation. In accordance with the judgment, the code comparing unit 87 outputs the synchronous timing signal 17 and the operation mode signal 89. If the parallel data are data for providing the synchronous timing, the synchronous timing signal 17 is made a LOW level for the period which is immediately subsequent to the data judgment process and corresponds to one cycle of the shift clock signal. If the parallel data are data for switching the operation state from the asynchronous operation to the synchronous operation, the code comparing unit 87 sets the operation mode signal 89 to be a LOW level, and, if the parallel data are data for switching the operation state from the synchronous operation to the asynchronous operation, sets the operation mode signal 89 to be a HIGH level.

The operation mode signal 89 is input into the synchronous controller 18 to control the synchronous operation starting signal 20. When the operation mode signal 89 is made a LOW level or the operation state is to be switched from the asynchronous operation to the synchronous operation, the fall of the synchronous timing signal 17 output from the code comparing unit 87 is detected, and the synchronous controller 18 outputs the synchronous operation starting signal 20. The synchronous operation starting signal 20 is input into the operation clock generator 9 to reset the counter of the operation clock generator 9, whereby the timing of starting the generation of the operation clock signal 5 is controlled in synchronism with the timing when the reception of the serial data 88 from the master is ended.

When the operation state is to be switched from the synchronous operation to the asynchronous operation, the synchronous operation starting signal 20 is set to be a HIGH level irrespective of the timing of ending the reception of the serial data 88. Since the synchronous operation starting signal 20 is a HIGH level, the counter of the operation clock generator 9 is not reset, and hence the output of the operation clock signal 5 is continued while maintaining the currently used timing relationship.

The microcomputer 8 monitors at Step 1111 the operation mode signal 89, and judges whether the operation state is switched over from the synchronous operation to the asynchronous operation, or from the asynchronous operation to the synchronous operation. When the former is selected, Steps 1112 through 1114 are executed, and, when the latter is selected, Steps 1115 through 1117 are executed. In the case where the operation state is to be switched over from the synchronous operation to the asynchronous operation, it is judged at Step 1112 whether the operation is in the synchronous operation or not. If the operation is not in the synchronous operation, Step 1114 is executed and then the processing for switching over the operation mode is ended. If the operation is in the synchronous operation, the synchronous operation is stopped at Step 1113, Step 1114 is then executed, and thereafter the processing for switching over the operation mode is ended.

In the case where the operation state is to be switched over from the asynchronous operation to the synchronous operation, it is judged at Step 1115 whether the operation is in the asynchronous operation or not. If the operation is in the asynchronous operation, the asynchronous operation is stopped at Step 1116. Step 1117 is then executed, and thereafter the processing for switching over the operation mode is ended. If the operation is not in the asynchronous operation, Step 1117 is executed and then the processing for switching over the operation mode is ended. At Step 1117, the processing similar to Steps 1014 through 1023 of FIG. 4 is executed. When the above-described processing is conducted, the master drive control commanding unit can switch over the operation state of the slave drive control commanding unit from the synchronous operation to the asynchronous operation or vice versa.

Embodiment 3

Figure 8:
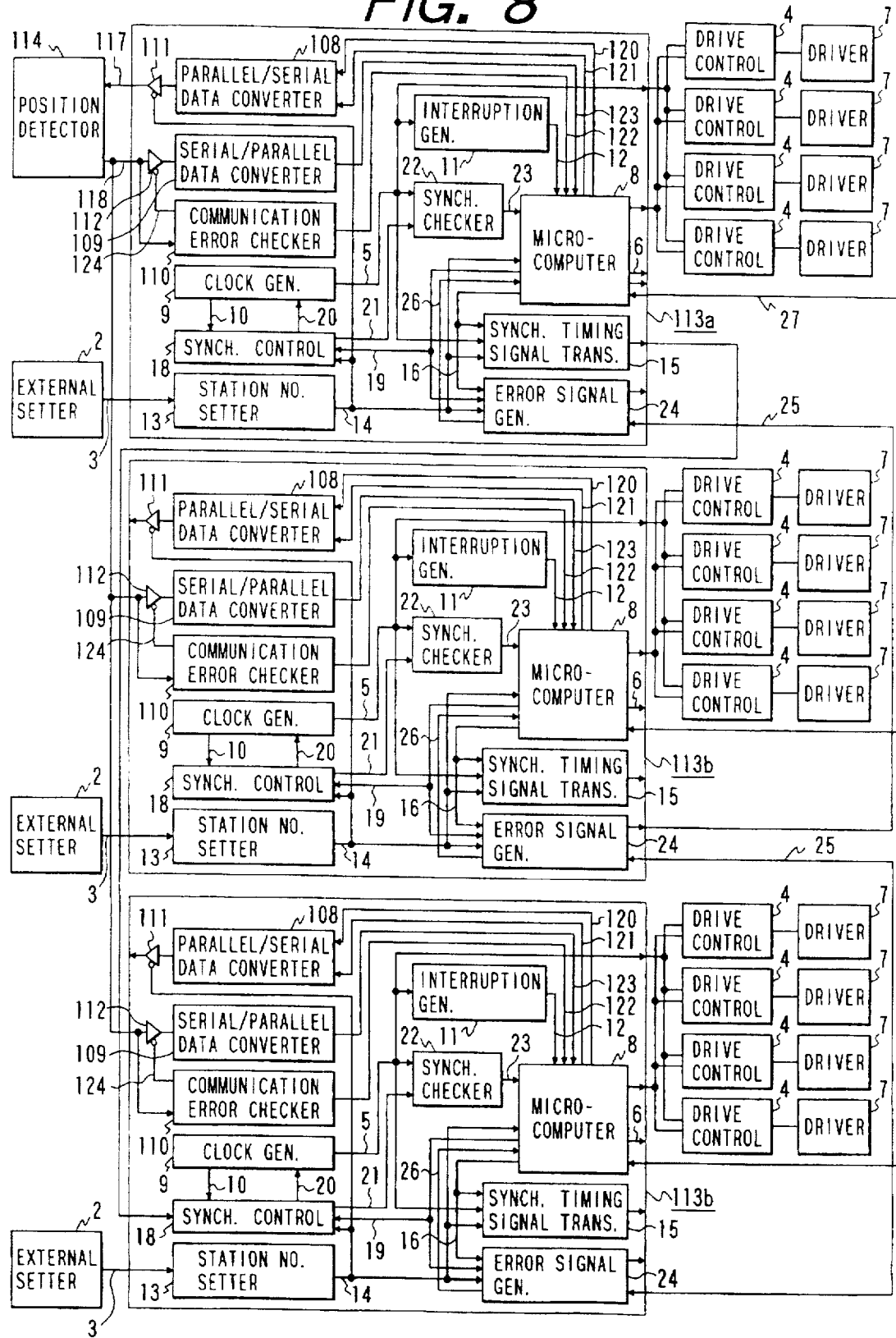
FIG. 8 is a block diagram of a synchronous system for drive control commanding units using single position detecting means, according to the invention.
Figure 9:
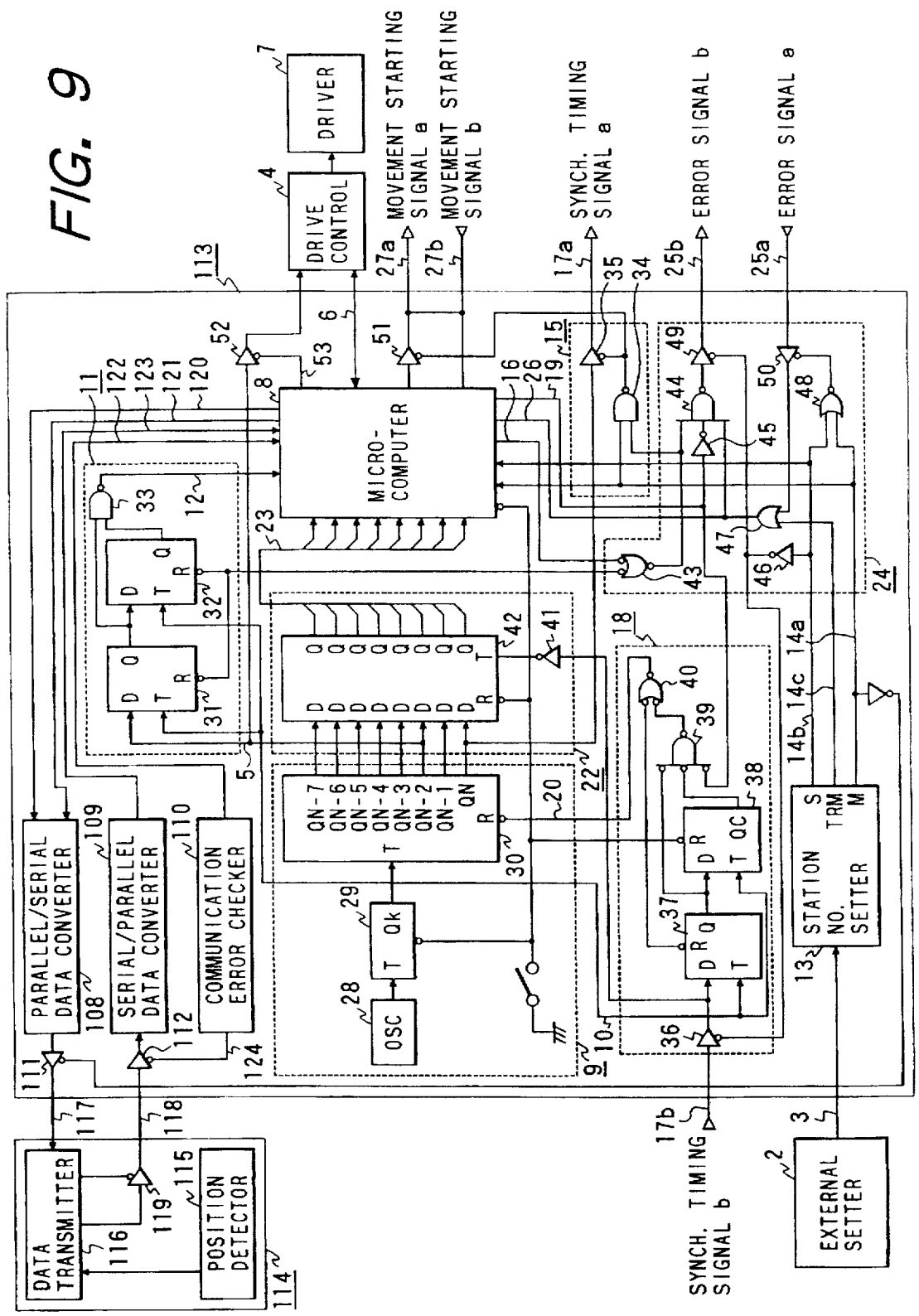
FIG. 9 is a circuit diagram of a drive control commanding unit constituting the synchronous system using the single position detecting means, according to the invention.
Figure 10:
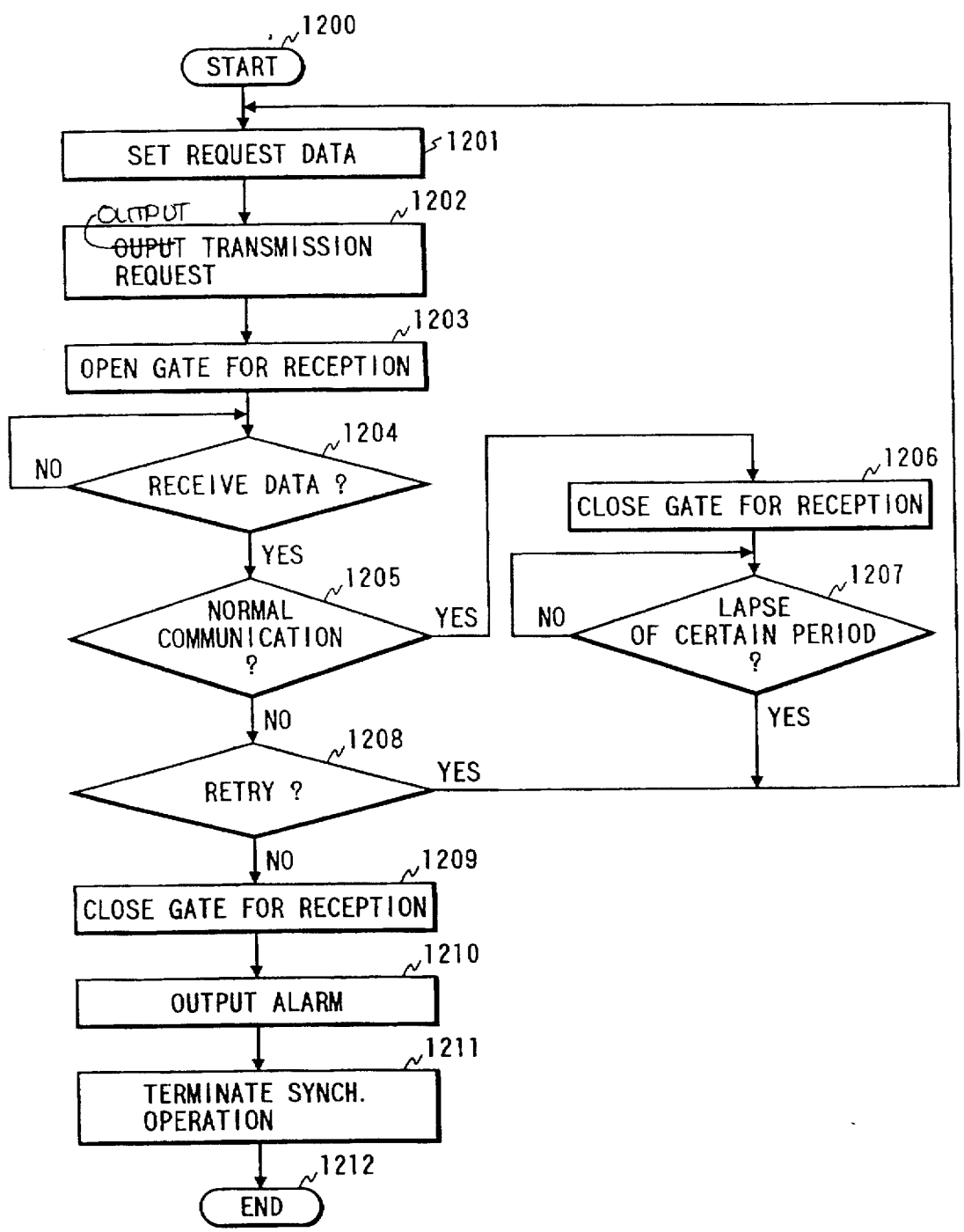
FIG. 10 is a flow chart showing a communication control method of the master drive control commanding unit in the communication between the unit and the position detecting means, according to the invention.
Figure 11:
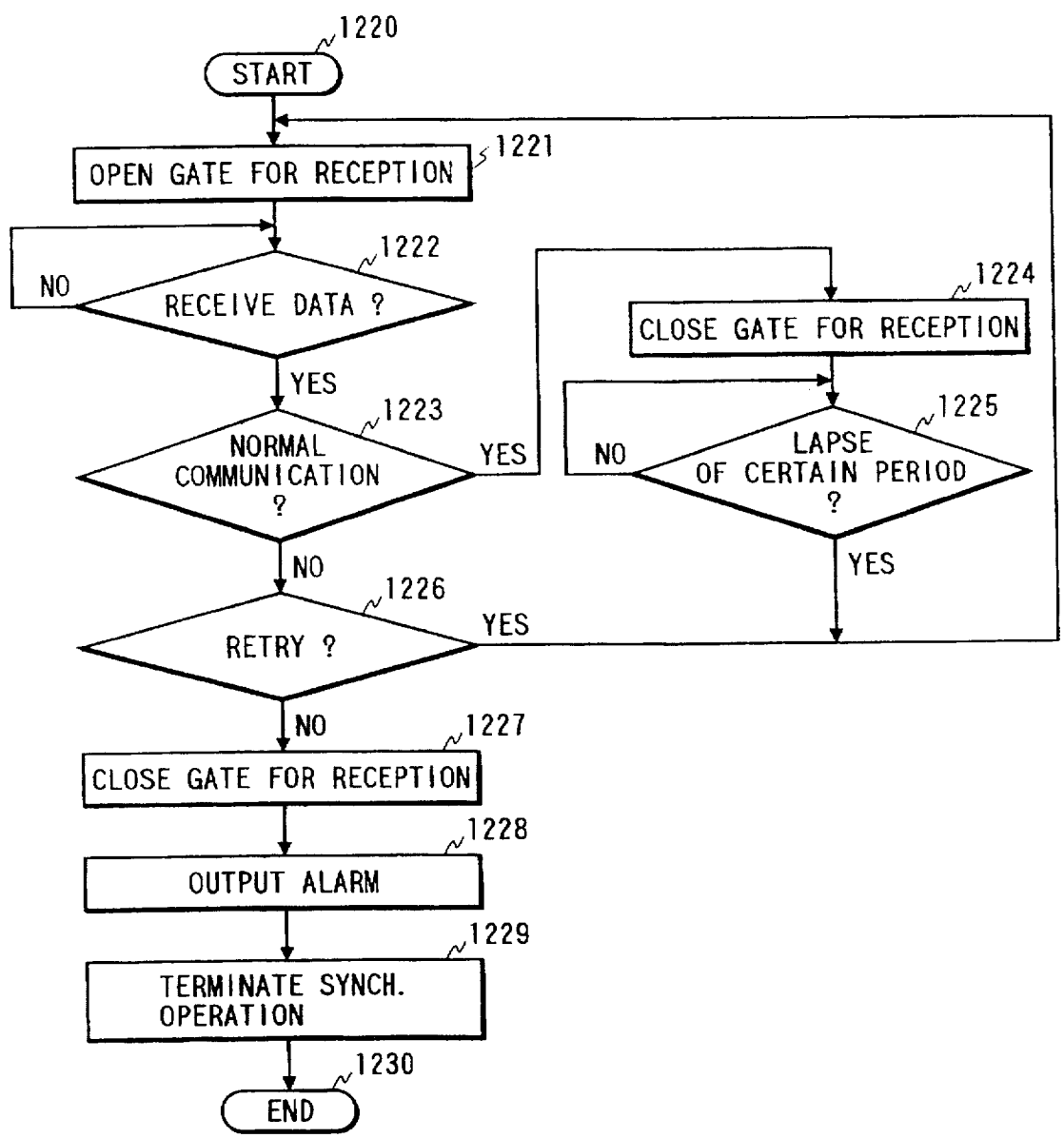
FIG. 11 is a flow chart showing a communication control method of a slave drive control commanding unit in the communication between the unit and the position detecting means, according to the invention.
Figure 12:
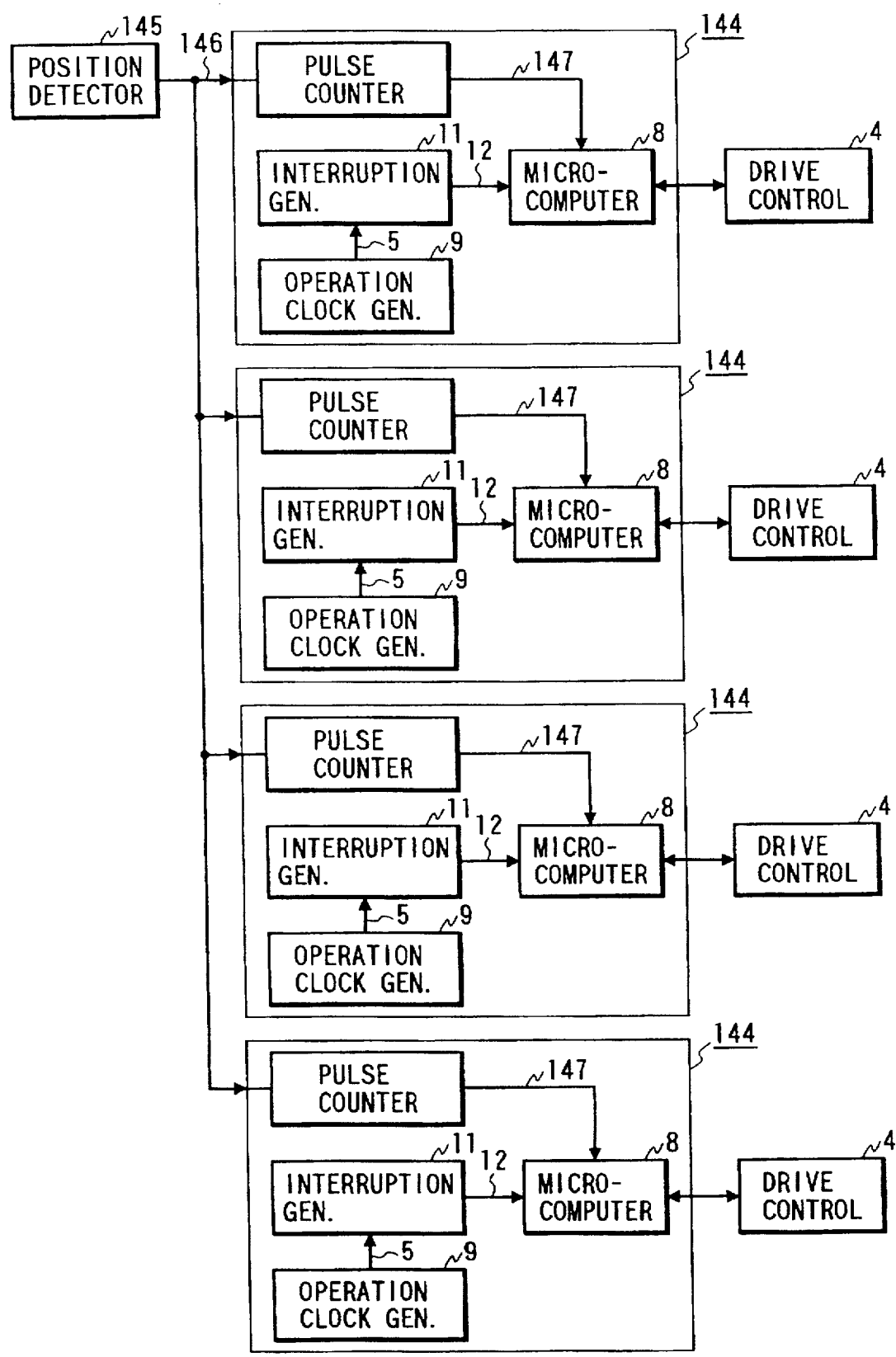
FIG. 12 is a block diagram of a synchronous system for conventional drive control commanding units.
Figure 13:
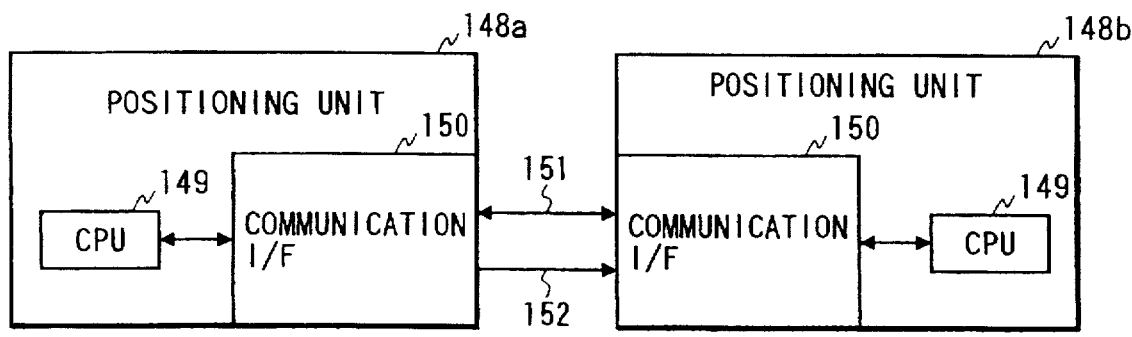
FIG. 13 is a block diagram of a synchronous system of conventional positioning units.
Figure 14:
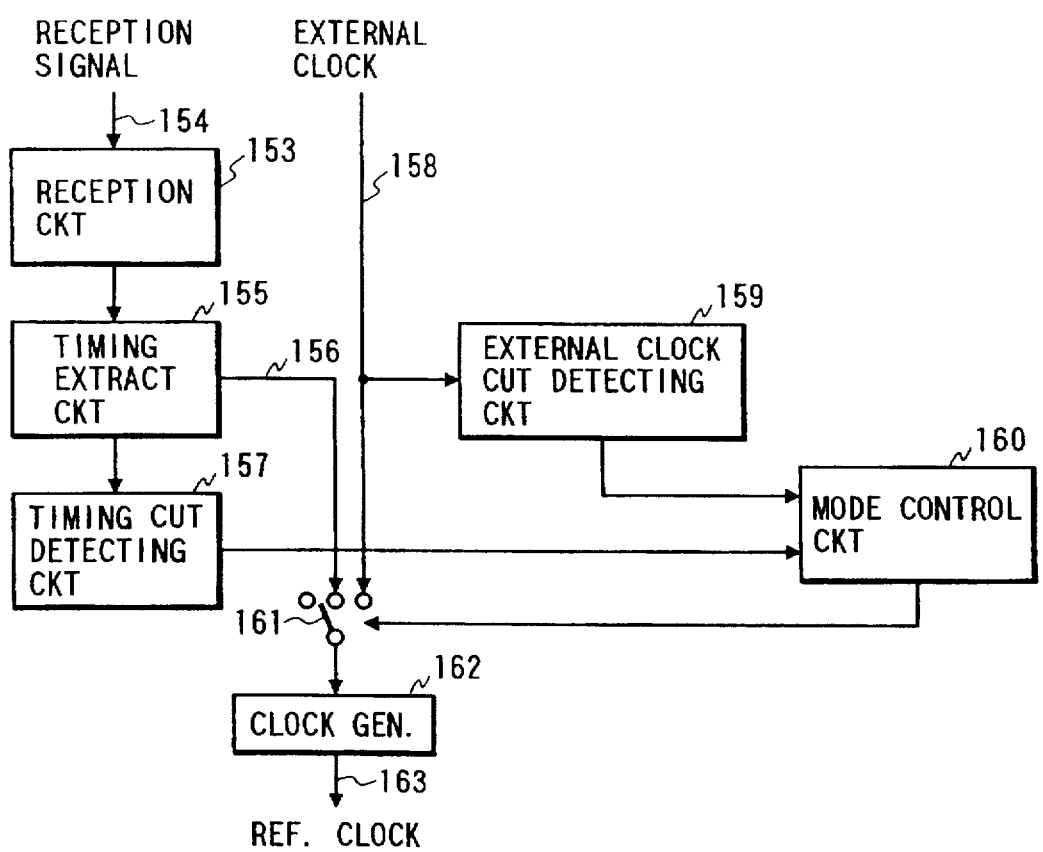
FIG. 14 is a block diagram of a synchronous system of conventional digital units.
Figure 15A:
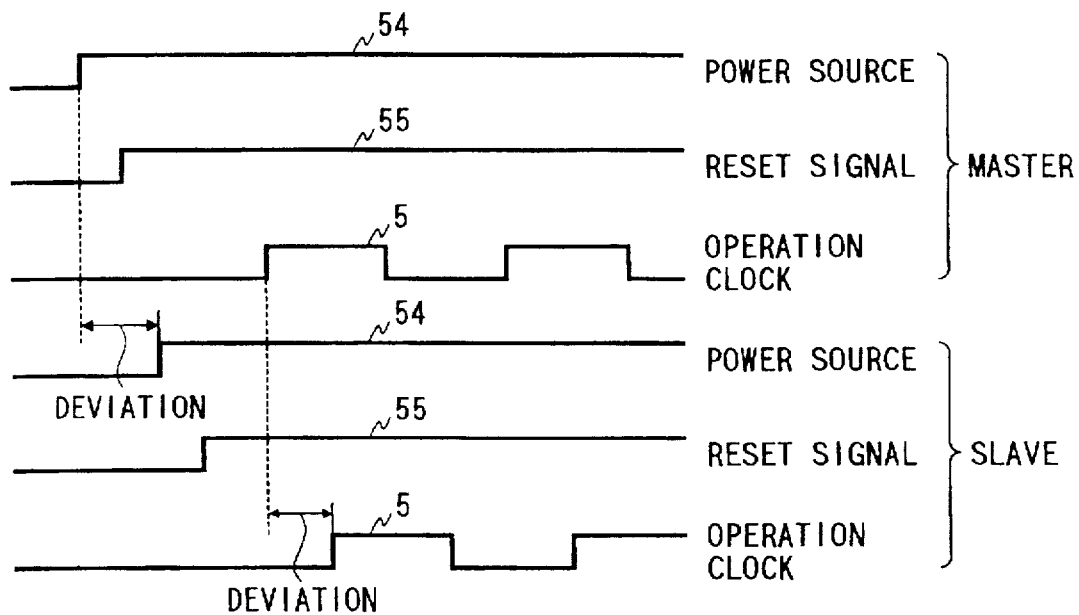
FIGS. 15A and 15B are waveform diagrams illustrating the operation of an operation clock signal of a conventional drive control commanding unit.
Figure 15B:
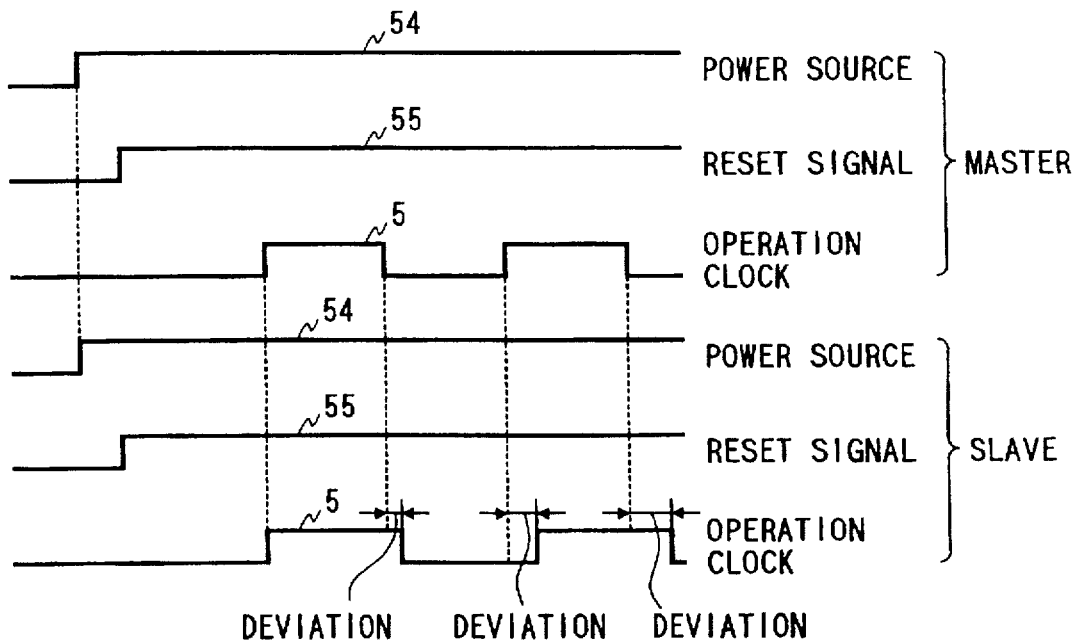

FIG. 8 is a block diagram of a synchronous system for a plurality of drive control commanding units, using a single position detector, which is a third embodiment of the invention. FIG. 9 is a circuit diagram of a drive control commanding unit constituting the synchronous system using the single position detector which implements the third embodiment of the invention. FIG. 10 is a flow chart showing a communication control method of the master drive control commanding unit in the communication between the unit and the position detector in connection with the third embodiment of the invention, and FIG. 11 is a flow chart showing a communication control method of a slave drive control commanding unit in the communication between the unit and the position detector in connection with the third embodiment of the invention.

In FIGS. 8 and 9, 108 designates a parallel/serial data converting unit which is operated only when the unit is operated as the master, and which converts request data in the parallel form output from the microcomputer 8 into a request signal in the serial form and then transmits the signal to the position detector. The reference numeral 109 designates a serial/parallel data converting unit which receives position data in the serial form output from the position detector 114, and which converts the data into parallel data. 110 designates a communication error checking unit which checks the position data received from the position detector 114, in accordance with parity check, framing error check, overrun error check, or the like, to see whether reception of the data are conducted normally or not, and 111 and 112 designate 3-state gates which control the enable and disable operations of input and output of serial data.

The reference numerals 113*a* and 113*b* designate drive control commanding units having the configuration in which the parallel/serial data converting unit 108, the serial/parallel data converting unit 109, the communication error checking unit 110, and the 3-state gates 111 and 112 are added to the drive control commanding unit 1 (1*a*, 1*b*) shown in FIG. 1. The unit 113*a* is used as the master, and the units 113*b* are used as slaves. The position detector 114 comprises: a position detector 115 which detects the position of an external apparatus such as a conveyor; a data transmitter 116 which receives data from the position detector 115 and a request signal 117 from the master drive control commanding unit 113*a*, and by which position data, alarm information, information of the operation state, etc. are singly or combined transmitted as position data 118 in accordance with the contents of the request signal 117; and a 3-state gate 119 which sets the output to be in a high impedance state except when the position data is to be transmitted to all the drive control commanding units 113*a* and 113*b*. In FIG. 8, the drive control commanding unit 113*a* operating as the master, the drive control commanding units 113 operating as plural slaves, and the single position detector 114 constitute the synchronous system.

Next, the operation will be described with reference to FIGS. 8 through 11. As illustrated in conjunction with FIG. 1, in a system wherein a master drive control commanding unit and plural slave drive control commanding units can be operated synchronously, when the operator sets the external setter 2 so that the corresponding unit is operated as a master or an nth-rank slave, the external setter 2 outputs the external setting signal 3 indicative of the station number. The station number setting unit 13 judges the contents of the external setting signal 3. When the unit has been set as the master, the station number setting unit 13 sets the station number setting signal 14*a* for the master mode to be a HIGH level, and the station number setting signal 14*b* for the slave mode to be a LOW level. When the unit is set to be used as the master and the station number setting signal 14*a* for the master mode is a HIGH level, the 3-state gate 111 for transmittance is opened so that the request signal 117 is transmitted.

At Step 1201, the microcomputer 8 of the master drive control commanding unit 113*a* sets to the parallel/serial data converting unit 108, request data 120 requesting the position detector 114 to output position data and alarm information necessary for a synchronous operation. Next, at Step 1202, the microcomputer 8 outputs to the single position detector 114 a transmission request signal 121 which is used for controlling the timing of transmitting the request signal 117. The parallel/serial data converting unit 108 generates the request signal 117 at the timing when the transmission request signal 121 is made active. The request signal 117 is then transmitted to the position detector 114 via the 3-state gate 111. At Step 1203, the microcomputer 8 of the master drive control commanding unit 113*a* opens the 3-state gate 112 for reception so that the position data 118 is received. When the position detector 114 receives the request signal 117, the detector transmits the detected position data 118 to all the drive control commanding units 113*a* and 113*b* which are connected to the data transmitter 116. The microcomputer 8 awaits at Step 1204 the reception of the position data 118.

When the position data 118 which has been received via the 3-state gate 112 for reception is input into the serial/parallel data converting unit 109, the serial/parallel data converting unit 109 converts the position data 118 into parallel data which can be handled in the microcomputer 8. The converted position data is supplied to the microcomputer 8 and then used for controlling the positions of the drive control units 4.

On the other hand, the microcomputer 8 of the slave drive control commanding unit 113*b* awaits without changing the state until receiving the position data 118 from the position detector 114. When the position data 118 is transmitted from the position detector 114, the position data 118 is received by the master drive control commanding unit 113*a*, and at the same time the position data 118 received via the 3-state gate 112 for reception is supplied to the serial/parallel data converting unit 109.

The serial/parallel data converting unit 109 converts the position data 118 into parallel data which can be handled in the microcomputer 8. The converted parallel data are supplied to the microcomputer 8 and then used for controlling the positions of the drive control units 4.

According to the configuration, the drive control commanding units 113*a* and 113*b* can receive the same data from the single the position detector 114, at the same timing and the same cycle. Since the plural drive control commanding units 113a and 113b operate in synchronism as described in Embodiment 1, it is possible to operate the plurality of drive control commanding units in synchronism with the position of the single position detector 114.

When the position data 118 is received at Step 1204 of FIG. 10, the master drive control commanding unit 113a checks to see whether the communication error checking unit 110 has normally received the position data 118 or not, and notifies the check result in the form of a check signal 122 to the microcomputer 8. If the reception has been conducted normally, the received data 123 are supplied to the microcomputer 8.

At Step 1205, the microcomputer 8 judges from the check result whether the communication has been conducted normally or not. If the communication has been conducted normally, the microcomputer 8 sets at Step 1206 a reception gate control signal 124 to be a HIGH level, whereby the 3-state gate 112 for reception is closed so that the position data 118 is inhibited from being received. The microcomputer 8 awaits at Step 1207 the lapse of a certain period which is the processing cycle, and thereafter returns to Step 1201 to perform the processing for reading the next position data.

The case where a communication error is caused to occur in the master drive control commanding unit 113a itself or in the slave drive control commanding unit 113b by a phenomenon that the wave form of the communication signal is disturbed by an external noise, etc. will be considered. In the master, the communication error checking unit 110 notifies the occurrence of the communication error to the microcomputer 8. In the slave, on the other hand, when the communication error checking unit 110 notifies the occurrence of the communication error to the microcomputer 8, the microcomputer 8 sets the error state signal 19 to be a HIGH level. Since the error state signal 19 is set to be a HIGH level, the output of the AND circuit 44 in the error signal generator 24 is made a LOW level so that the error signal 25b is made a LOW level. In this way, the slave notifies the occurrence of a communication error to the microcomputer 8 by making the error signal 25b a LOW level.

When a communication error occurs in the master or in one of the slaves, the microcomputer 8 checks at Step 1208 the number of retry operations. If the retry number fails to reach a preset number, the microcomputer 8 returns to Step 1201 to perform the processing for reading the next position data. If retry operations of a number greater than the preset number have been performed, the microcomputer 8 executes the processing for ending the operation of Steps 1209 through 1211. Specifically, the microcomputer 8 sets at Step 1209 the reception gate control signal 124 to be a HIGH level, whereby the 3-state gate 112 for reception is closed so that the position data is inhibited from being received. At Step 1210, the microcomputer 8 outputs an alarm indicating that there occurs a communication failure inside the microcomputer 8, stops at 1211 the synchronous operation, and thereafter ends the processing.

On the other hand, the slave drive control commanding unit 113b opens at Step 1221 of FIG. 11 the 3-state gate 112 for reception so that the position data 118 can be received, and awaits at Step 1222 until the position data 118 is received. When the position data 118 is received, the communication error checking unit 110 checks to see whether the position data 118 has been received normally or not, and notifies the check result to the microcomputer 8. On the basis of the check result, the microcomputer 8 judges at Step 1223 whether the communication has been conducted normally or not.

If the communication has been conducted normally, the microcomputer 8 sets at Step 1224 the reception gate control signal 124 to be a HIGH level, whereby the 3-state gate 112 for reception is closed so that the position data 118 is inhibited from being received. The microcomputer 8 sets the error state signal 19 to be a LOW level, and hence the error signal generator 24 makes the error signal 25b a HIGH level, whereby the master drive control commanding unit 113a is notified that there occurs no error and the operation is normally conducted. The microcomputer 8 awaits at Step 1225 the lapse of the certain period which is the processing cycle, and thereafter returns to Step 1221 to await the next reception. When a communication error is caused to occur by a phenomenon that the wave form of the communication signal is disturbed by an external noise, the microcomputer 8 sets the error state signal 19 to be a HIGH level, and hence the error signal generator 24 makes the error signal 25b a LOW level, whereby the master drive control commanding unit 113a is notified that there occurs the communication error.

The microcomputer 8 checks at Step 1226 the number of retry operations. If the retry number fails to reach a preset number, the microcomputer 8 returns to Step 1221 to await the next reception. If retry operations of a number greater than the preset number have been performed, the microcomputer 8 executes the processing for ending the operation of Step 1227 and the subsequent steps. Specifically, the microcomputer 8 sets at Step 1227 the reception gate control signal 124 to be a HIGH level, whereby the 3-state gate 112 for reception is closed so that the position data is inhibited from being received. At Step 1228, the microcomputer 8 outputs an alarm indicating that there occurs a communication failure inside the microcomputer 8, stops at Step 1229 the synchronous operation, and thereafter ends the processing at step 1230.

In Embodiment 3, all the drive control commanding units 113a and 113b transmit the request signal 117 to the position detector 114 at a certain timing so as to conform to the processing cycle of performing the motion control of the drive control units, and repeatedly execute the above-described processing of reading data.

In Embodiment 1, one circuit of the master drive control commanding unit is connected by means of a certain signal to one corresponding circuit of each of the plural slave drive control commanding units, in such a manner that, for example, the synchronous timing signal output from the synchronous check circuit of the master drive control commanding unit is input into the synchronous check circuits of the plural slave drive control commanding units. Alternatively, means for coding signals to data which can be subjected to a serial communication, and means for decoding the data may be provided. In this alternative, the same operations as those described above can be done by transmitting and receiving signals through a serial communication using one set of transmission and reception cables.

In Embodiment 1, the clock signal output from the crystal oscillator is divided by $2^{11}$ and then used as the operation clock signal. When a crystal oscillator of 1 Mhz is used, therefore, an operation clock signal of 488 Hz is obtained, with the result that a synchronous error due to the difference between internal clock signals is 1 μsec. In accordance with the required synchronous accuracy, the frequency of the crystal oscillator may be lowered, or the division ratio of the internal clock signal may be changed, so as to comply with the request for reducing the cost.

In Embodiment 1, the counter and the latch circuit are used in order to check synchronism deviation. Alternatively, the same operations as those described above can be done by constituting the counter by a software and stopping the count-up operation of the counter.

In Embodiment 3, when a communication error occurs, the drive control commanding unit which is the master retransmits the request signal to the position detector, whereby only the drive control commanding unit wherein the communication error occurs is allowed to newly receive a position data. Alternatively, a drive control commanding unit which has normally received a position data transmits the position data to the drive control commanding unit wherein a communication error occurs. Also in the alternative, it is expected to conduct the same operations as those described above.

The invention configured as described above can attain the following effects:

Synchronous check means for checking the synchronous states of a plurality of slave drive control commanding units, a synchronous control circuit which outputs a synchronous operation starting signal based on a synchronous timing signal received from the master, and error signal generating means for outputting an error signal based on an error state signal indicative of a synchronous operation ready state and a synchronous state are provided so that the operation clock signals of the plural drive control commanding units are generated at the same timing as the operation clock signal of the master drive control commanding unit. Therefore, the synchronous operation can be done among the plurality of drive control commanding units.

Furthermore, a counter which divides a clock signal output from a crystal oscillator into 1/N portions to generate a operation clock signal, a latch circuit which latches the value of the counter at the instant when a synchronous timing signal falls, and a microcomputer which compares the latched contents of the latch circuit with a previously set value to check to see whether the synchronization is normal or not are provided, whereby the master drive control commanding unit is allowed to be notified that the operation clock signal of a slave drive control commanding unit is deviated in synchronism from that of the master drive control commanding unit. When there occurs an abnormality in the synchronous state in one of the slave drive control commanding units, therefore, it is possible to stop the operation.

Furthermore, parallel/serial data converting means for converting parallel data carrying information for switching the operation state, into serial data, serial/parallel data converting means for converting serial data received from the master first drive control commanding unit, into parallel data, shift clock signal generating means for outputting a shift clock signal which provides the timing at which the parallel/serial data converting means or the serial/parallel data converting means transmits or receives the serial data, code comparing means for comparing serial data received doubly with each other, and for recognizing an operation mode, mode switching means for switching over the timing of supplying an operation clock signal are provided, whereby the operation state of a slave drive control commanding unit is allowed to be switched over from the outside. Therefore, the operation states of plural slave drive control commanding units which are currently operated on the basis of serial data supplied from the master drive control commanding unit can be switched over from the asynchronous operation to the synchronous operation or vice versa.

Furthermore, parallel/serial data converting means for outputting a request signal requesting position detecting means to transmit position data, in accordance with request data output from a microcomputer, a serial/parallel data converter which converts the position data received from position detecting means into parallel data which can be handled in the microcomputer, and a communication checker which ascertains whether the position data is normally received or not are disposed, whereby only the request signal from the master drive control commanding unit is allowed to request the position data to the position detecting means so that the unit receives the position data.

When a communication error occurs, a drive control commanding unit which is the master retransmits a request signal to position detecting means, whereby only the drive control commanding unit wherein the communication error occurs is allowed to newly receive a position data. Therefore, synchronism deviation of the drive control commanding unit wherein the communication error occurs can be suppressed to a minimum level, and, even when there occurs a communication error, a normal synchronous operation which is free from synchronism deviation can immediately be restored.

When a communication error occurs in a slave, error signal generating means and an error signal which are used in the synchronous check are commonly used in order to notify the occurrence of the communication error to the master. Therefore, the circuit can be simplified in configuration and wiring can be reduced in number.

What is claimed is:

1. A drive control commanding unit comprising: operation clock generating means for generating an operation clock signal; interruption generating means for outputting an interruption signal at every cycle of the operation clock signal; station number setting means for setting a station number indicating whether said unit is operated as a first drive control commanding unit or a second drive control commanding unit; synchronous timing signal transmitting means for, only when said unit is operated as said first drive control commanding unit, outputting a synchronous timing signal based on the operation clock signal; synchronous control means for, only when said unit is operated as said second drive control commanding unit, outputting a synchronous operation starting signal based on an error state signal indicative of a synchronous operation ready state and a synchronous state, and the synchronous timing signal received from said first drive control commanding unit; synchronous check means for judging whether the operation of said second drive control commanding unit is synchronized with the operation of said first drive control commanding unit; error signal generating means for outputting an error signal based on the error state signal; and a microcomputer which, when said unit is operated as said first drive control commanding unit, outputs a movement starting signal and conducts a synchronous control, and which, when said unit is operated as said second drive control commanding unit, conducts a synchronous control in accordance with an input of a movement starting signal.

2. A drive control commanding unit as described in claim 1, wherein said unit further comprises: count means for dividing a clock signal output from a crystal oscillator into 1/N portions to generate the operation clock signal, where N is a whole number; latch means for latching the value of said count means at an instant when the synchronous timing signal is changed in level; and synchronous check means for comparing latched contents of said latch means with a previously set value to determine whether the synchronization is normal.

3. A synchronous control system comprising a plurality of drive control commanding units, wherein a first drive control commanding unit outputs a synchronous timing signal and movement starting signal to a second drive control commanding unit, and said second drive control commanding unit synchronizes an operation clock signal with said first drive control commanding unit based on the synchronous timing signal received from said first drive control commanding unit, and executes a synchronous operation based on the received movement starting signal.

4. A synchronous control method for drive control commanding units, comprising the steps of: judging whether one of said units is set as a first drive control commanding unit or a second drive control commanding unit; when it is judged that said one unit is set as said first drive control commanding unit, judging a completion of readiness of said second drive control commanding unit; when the completion of readiness is judged, outputting a synchronous timing signal to said second drive control commanding unit to synchronize an operation clock signal with said first drive control commanding unit; executing a process of controlling a position and a speed on a drive control unit which controls a drive unit; judging whether a synchronous state is satisfactory; when the synchronous state is satisfactory, executing a synchronous operation; when the synchronous state is not satisfactory, stopping the synchronous operation and outputting a synchronous deviation alarm; judging whether the synchronous operation is to be terminated; and, when the synchronous operation is to be terminated, causing the output of the synchronous timing signal to said second drive control commanding unit to be halted, and causing said second drive control commanding unit to stop the synchronous operation, and ending the synchronous operation.

5. A synchronous control method for drive control commanding units, comprising the steps of: judging whether one of said units is set as a first drive control commanding unit or a second drive control commanding unit; when it is judged that said unit is set as said second drive control commanding unit, executing a preparation for operation and, when the preparation is completed, outputting a signal indicating the completion of the operation preparation to said first drive control commanding unit; awaiting reception of a synchronous timing signal from said first drive control commanding unit; in response to the reception of the synchronous timing signal, executing a process of controlling a position and a speed on a drive control unit which controls a drive unit; judging whether a synchronous state is satisfactory; when the synchronous state is satisfactory, executing a synchronous operation; when the synchronous state is not satisfactory, outputting an error signal to said first drive control commanding unit, stopping the synchronous operation and outputting a synchronous deviation alarm; judging whether the synchronous operation is to be terminated; and, when the synchronous operation is to be terminated, causing the synchronous operation to be stopped.

6. A synchronous control method for drive control commanding units, comprising the steps of:

judging whether one of said units is set as a first drive control commanding unit or a second drive control commanding unit;

when it is judged that said unit is set as said first drive control commanding unit, said method further comprising the steps of: judging a completion of readiness of said second drive control commanding unit; when the completion of readiness is judged, outputting a synchronous timing signal to said second drive control commanding unit to synchronize an operation clock signal with said first drive control commanding unit; executing a process of controlling a position and a speed on a drive control unit which controls a drive unit; judging whether a synchronous state is satisfactory; when the synchronous state is satisfactory, executing a synchronous operation; when the synchronous state is not satisfactory, stopping the synchronous operation and outputting a synchronous deviation alarm; judging whether the synchronous operation is to be terminated; and, when the synchronous operation is to be terminated, causing an output of the synchronous timing signal to said second drive control commanding unit to be halted, and causing said second drive control commanding unit to stop the synchronous operation, and ending the synchronous operation;

when it is judged that said unit is set as said second drive control commanding unit, said method further comprising the steps of: executing preparation for operation and, when preparation is completed, outputting a signal indicating the completion of operation preparation to said first drive control commanding unit; awaiting reception of a synchronous timing signal from said first drive control commanding unit; in response to reception of the synchronous timing signal, executing a process of controlling a position and a speed on a drive control unit which controls a drive unit; judging whether a synchronous state is satisfactory; when the synchronous state is satisfactory, executing a synchronous operation; when the synchronous state is not satisfactory, outputting an error signal to said first drive control commanding unit, stopping the synchronous operation and outputting a synchronous deviation alarm; judging whether the synchronous operation is to be terminated; and, when the synchronous operation is to be terminated, causing the synchronous operation to be stopped.

7. A drive control commanding unit comprising: a microcomputer; operation clock generating means for generating an operation clock signal; interruption generating means for outputting an interruption signal to said microcomputer at every cycle of the operation clock signal; station number setting means for setting a station number indicating whether said unit is operated as a first drive control commanding unit or a second drive control commanding unit; parallel/serial data converting means for, when said unit is operated as said first drive control commanding unit, converting parallel data from said microcomputer into serial data; serial/parallel data converting means for, when said unit is operated as said second drive control commanding unit, converting serial data received from said first drive control commanding unit into parallel data which can be handled in said microcomputer; shift clock signal generating means for outputting a shift clock signal which provides a timing at which said parallel/serial data converting means or said serial/parallel data converting means transmits or receives the serial data; and code comparing means for, when said unit is operated as said second drive control commanding unit, comparing serial data received doubly with each other to check whether there is an abnormality, and for recognizing an operation mode for switching an operation state between an asynchronous operation and a synchronous operation, said microcomputer, when said unit is operated as said first drive control commanding unit, outputting a movement starting signal and conducting synchronous control, and, when said unit is operated as said second drive control commanding unit, conducting a synchronous control in accordance with an input of a movement starting signal.

8. A synchronous control method for drive control commanding units, comprising the steps of: judging whether one of said units is set as a first drive control commanding unit or a second drive control commanding unit; when it is judged that said unit is set as said first drive control commanding unit, outputting serial data to said second drive control commanding unit; judging a completion of readiness of said second drive control commanding unit; executing a process of controlling a position and a speed on a drive control unit which controls a drive unit; judging whether a synchronous state is satisfactory; when the synchronous state is satisfactory, executing a synchronous operation; when the synchronous state is not satisfactory, stopping the synchronous operation and outputting a synchronous deviation alarm; judging whether the synchronous operation is to be terminated; and, when the synchronous operation is to be terminated, causing the output of the synchronous timing signal to said second drive control commanding unit to be halted, causing said second drive control commanding unit to stop the synchronous operation, and ending the synchronous operation.

9. A synchronous control method for drive control commanding units, comprising the steps of: judging whether one of said units is set as a first drive control commanding unit or a second drive control commanding unit; when it is judged that said unit is set as said second drive control commanding unit, awaiting reception of serial data from said first drive control commanding unit; executing a preparation for operation and, when the preparation is completed, outputting a signal indicating the completion of the operation preparation to said first drive control commanding unit; in response to a reception of the serial data, executing a process of controlling a position and a speed on a drive control unit which controls a drive unit; judging whether a synchronous state is satisfactory; when the synchronous state is satisfactory, executing a synchronous operation; when the synchronous state is not satisfactory, outputting an error signal to said first drive control commanding unit, stopping the synchronous operation and outputting a synchronous deviation alarm; judging whether the synchronous operation is to be terminated; and, when the synchronous operation is to be terminated, causing the synchronous operation to be stopped.

10. A synchronous control method for drive control commanding units, comprising the steps of: judging whether one of said units is set as a first drive control commanding unit or a second drive control commanding unit;

when it is judged that said unit is set as said first drive control commanding unit, the method further comprising the steps of: outputting serial data to said second drive control commanding unit; judging a completion of readiness of said second drive control commanding unit; executing a process of controlling a position and a speed on a drive control unit which controls a drive unit; judging whether a synchronous state is satisfactory; when the synchronous state is satisfactory, executing a synchronous operation; when the synchronous state is not satisfactory, stopping the synchronous operation and outputting a synchronous deviation alarm; judging whether the synchronous operation is to be terminated; and, when the synchronous operation is to be terminated, causing an output of the synchronous timing signal to said second drive control commanding unit to be halted, and causing said second drive control commanding unit to stop the synchronous operation, and ending the synchronous operation;

when it is judged that said unit is set as said second drive control commanding unit, said method further comprising the steps of: awaiting reception of serial data from said first drive control commanding unit; executing a preparation for operation and, when the preparation is completed, outputting a signal indicating the completion of the operation preparation to said first drive control commanding unit; in response to reception of the serial data, executing a process of controlling a position and a speed on a drive control unit which controls a drive unit; judging whether a synchronous state is satisfactory; when the synchronous state is satisfactory, executing a synchronous operation; when the synchronous state is not satisfactory, outputting an error signal to said first drive control commanding unit, stopping the synchronous operation and outputting a synchronous deviation alarm; judging whether the synchronous operation is to be terminated; and, when the synchronous operation is to be terminated, causing the synchronous operation to be stopped.

11. A drive control commanding unit comprising a microcomputer; operation clock generating means for generating an operation clock signal; interruption generating means for outputting an interruption signal to said microcomputer at every cycle of the operation clock signal; station number setting means for setting a station number indicating whether said unit is operated as a first drive control commanding unit or a second drive control commanding unit; synchronous timing signal transmitting means for, only when said unit is operated as said first drive control commanding unit, outputting a synchronous timing signal based on the operation clock signal; synchronous control means for, only when said unit is operated as said second drive control commanding unit, outputting a synchronous operation starting signal based on an error state signal indicative of a synchronous operation ready state and a synchronous state, and the synchronous timing signal received from said first drive control commanding unit; synchronous check means for judging whether the operation of said second drive control commanding unit is synchronized with the operation of said first drive control commanding unit; error signal generating means for outputting an error signal based on the error state signal; parallel/serial data converting means for, when said unit is operated as said first drive control commanding unit, outputting a request signal for requesting a position detecting means to transmit position data in accordance with request data from said microcomputer; serial/parallel data converting means for converting the position data in serial form received from said position detecting means, into parallel data; communication check means for checking whether the position data is accurately input.

12. A drive control commanding unit as described in claim 11, wherein, when a communication error occurs in said second drive control commanding unit, said error signal generating means and the error signal which are used in the synchronous check are commonly used in order to notify the occurrence of the communication error to said first drive control commanding unit.

13. A synchronous control system comprising one position detecting means and a plurality of drive control commanding units, wherein a first drive control commanding unit outputs a synchronous timing signal and a movement starting signal to a second drive control commanding unit, outputs a request signal to said position detecting means, and executes a synchronous operation in synchronism with position data from said position detecting means, and said second drive control commanding unit synchronizes an operation clock signal with said first drive control commanding unit based on the synchronous timing signal received from said first drive control commanding unit, and executes a synchronous operation in synchronism with the received movement starting signal, and the position data from said position detecting means.

14. A synchronous control method for drive control commanding units, said method comprising the steps of: when one of said units is set as a first drive control commanding unit, outputting a request signal to a position detecting means, the request signal for requesting said position detecting means to transmit position data necessary for a synchronous operation, and alarm information; awaiting reception of the position data from said position detecting means in response to the request signal; judging whether the reception of the position data is conducted normally to said first drive control commanding unit and a second drive control commanding unit; when the reception of the position data is conducted normally, disabling the reception of the position data, and awaiting a lapse of a given period of time before next position data is read out; and, when the reception of the position data is conducted abnormally, judging the number of retry operations, and, when the retry number is equal to or less than a preset number, returning to the step of transmitting the request signal to said position detecting means, and, when the retry number is larger than the preset number, outputting an alarm, and stopping the synchronous operation.

15. A synchronous control method for drive control commanding units, said method comprising the steps of: when said unit is set as a second drive control commanding unit, awaiting reception of position data from a position detecting means in response to a request signal; judging whether the reception of the position data is conducted normally; when the reception of the position data is conducted normally, disabling the reception of the position data, and awaiting a lapse of a given period of time before next position data is read out; and, when the reception of the position data is conducted abnormally, judging a number of retry operations, and, when the retry number is equal to or less than a preset number, returning to the step of awaiting reception of the position data from said position detecting means in response to the request signal, and, when the retry number is larger than the preset number, outputting an alarm, and stopping the synchronous operation, wherein only a drive control commanding unit in which the reception of the position data is conducted abnormally receives new position data.

16. A synchronous control method for drive control commanding units, said method comprising the steps of:

(a) when one of said units is set as a first drive control commanding unit, said method comprises the steps of: outputting a request signal to a position detecting means, the request signal requesting said position detecting means to transmit position data necessary for a synchronous operation, and alarm information; awaiting a reception of the position data from said position detecting means in response to the request signal; judging whether the reception of the position data is conducted normally to a second drive control commanding unit; when the reception of the position data is conducted normally, disabling the reception of the position data, and awaiting a lapse of a given period of time before next position data is read out; and, when the reception of the position data is conducted abnormally, judging a number of retry operations, and, when the retry number is equal to or less than a preset number, returning to the step of transmitting the request signal to said position detecting means, and, when the retry number is larger than the preset number, outputting an alarm, and stopping the synchronous operation, and (b) when said unit is set as said second drive control commanding unit, said method comprises the steps of: awaiting a reception of position data from said position detecting means in response to the request signal; judging whether the reception of the position data is conducted normally; when the reception of the position data is conducted normally, disabling the reception of the position data, and awaiting a lapse of a given period of time before next position data is read out; and, when the reception of the position data is conducted abnormally, judging a number of retry operations, and, when the retry number is equal to or less than a preset number, returning to the step of awaiting the reception of the position data from said position detecting means in response to the request signal, and, when the retry number is larger than the preset number, outputting an alarm, and stopping the synchronous operation, wherein only a drive control commanding unit in which the reception of the position data is conducted abnormally receives new position data.

\* \* \* \* \*